US011449216B2

(12) United States Patent
Rho et al.

(10) Patent No.: US 11,449,216 B2
(45) Date of Patent: Sep. 20, 2022

(54) METHOD AND ELECTRONIC DEVICE FOR INTERACTING BETWEEN MULTIPLE AREAS OF A DISPLAY

(71) Applicant: Samsung Electronics Co., Ltd., Gyeonggi-do (KR)

(72) Inventors: Jaeyeon Rho, Gyeonggi-do (KR); Jiyeon Kwak, Gyeonggi-do (KR); Yeojun Yoon, Gyeonggi-do (KR); Jooho Seo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 59 days.

(21) Appl. No.: 16/709,385

(22) Filed: Dec. 10, 2019

(65) Prior Publication Data

US 2020/0201501 A1 Jun. 25, 2020

(30) Foreign Application Priority Data

Dec. 19, 2018 (KR) .......................... 10-2018-0165374

(51) Int. Cl.
*G06F 3/0488* (2022.01)
*G06F 3/041* (2006.01)

(52) U.S. Cl.
CPC .......... *G06F 3/0488* (2013.01); *G06F 3/0412* (2013.01); *G06F 3/0416* (2013.01); *G06F 2203/04104* (2013.01)

(58) Field of Classification Search
CPC .... G06F 3/0488; G06F 3/0412; G06F 3/0416; G06F 2203/04104
See application file for complete search history.

(56) References Cited

U.S. PATENT DOCUMENTS

| 9,946,383 | B2* | 4/2018 | Cady .................... G06F 3/0488 |
| 2013/0181902 | A1* | 7/2013 | Hinckley ............. G06F 1/1684 345/168 |
| 2014/0218309 | A1 | 8/2014 | Park |
| 2015/0015511 | A1 | 1/2015 | Kwak et al. |
| 2015/0338954 | A1 | 11/2015 | Yang et al. |
| 2016/0062515 | A1* | 3/2016 | Bae ..................... G06F 3/04817 345/174 |
| 2018/0157409 | A1* | 6/2018 | Jung .................... G06F 3/0485 |

(Continued)

FOREIGN PATENT DOCUMENTS

| CN | 102591576 | 7/2012 |
| EP | 2 390 777 | 11/2011 |

(Continued)

OTHER PUBLICATIONS

International Search Report dated Mar. 26, 2020 issued in counterpart application No. PCT/KR2019/016938, 9 pages.

*Primary Examiner* — Priyank J Shah
(74) *Attorney, Agent, or Firm* — The Farrell Law Firm, P.C.

(57) ABSTRACT

An electronic device is provided and includes a display including a front area and a plurality of side areas, at least one processor, and at least one memory. The at least one memory stores instructions configured to, when executed, enable the at least one processor to receive a grip input for the display, identify a grip type based on the grip input, receive a touch input to at least one of the plurality of side areas while the electronic device is gripped, and identify a function corresponding to the touch input based on the identified grip type.

17 Claims, 23 Drawing Sheets

(56) References Cited

U.S. PATENT DOCUMENTS

2019/0020760 A1* 1/2019 DeBates ................ H04M 3/42
2020/0026354 A1* 1/2020 Swindells ......... H04M 1/72454

FOREIGN PATENT DOCUMENTS

| EP | 3 343 341 | 7/2018 |
| KR | 1020150007925 | 1/2015 |
| KR | 10-2016-0028338 | 3/2016 |
| KR | 10-2016-0000396 | 4/2016 |

* cited by examiner

METHOD AND ELECTRONIC DEVICE FOR INTERACTING BETWEEN MULTIPLE AREAS OF A DISPLAY

CROSS-REFERENCE TO RELATED APPLICATION(S)

This application is based on and claims priority under 35 U.S.C. § 119 to Korean Patent Application No. 10-2018-0165374, filed on Dec. 19, 2018, in the Korean Intellectual Property Office, the disclosure of which is incorporated by reference herein in its entirety.

BACKGROUND

1. Field

The disclosure generally relates to methods and electronic devices for interacting between a plurality of areas of a display.

2. Description of Related Art

With portable, personal electronic devices in wide use, design technology for flexible display panels and cover windows enables production of displays with an outer edge portion bent at an increasingly smaller radius of curvature. The display is exposed to the outside of the electronic device. An outer side area of the display may be curved and used for display purposes. For example, the side area may function as an input device for the electronic device to receive the user's input (e.g., touch inputs) or as an output device of the electronic device to display various types of data, such as a screen, other contents or state information output on other areas of the display.

SUMMARY

The present disclosure has been made to address the above-mentioned problems and disadvantages, and to provide at least the advantages described below.

In accordance with an aspect of the present disclosure, an electronic device is provided. The electronic device includes a display including a front area and a plurality of side areas, at least one processor, and at least one memory, the at least one memory stores instructions configured to, when executed, enable the at least one processor to receive a grip input for the display, identify a grip type based on the grip input, receive a touch input on at least one of the plurality of side areas while the electronic device is gripped, and identify a function corresponding to the touch input based on the identified grip type.

In accordance with another aspect of the present disclosure, a method for interacting between a plurality of side areas of a display included in an electronic device is provided. The method includes receiving a grip input for the display, identifying a grip type based on the grip input, receiving a touch input on at least one of the plurality of side areas while the electronic device is gripped, and identifying a function corresponding to the touch input based on the identified grip type.

In accordance with another aspect of the present disclosure, a non-transitory computer readable recording medium recording a program running on a computer is provided. The program includes executable instructions configured to, when executed by a processor, enable the processor to receive a grip input for a display included in an electronic device, identify a grip type based on the grip input, receive a touch input on at least one of a plurality of side areas of the display while the electronic device is gripped, and identify a function corresponding to the touch input based on the identified grip type.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

According to an embodiment, a method and electronic device for interacting between a plurality of areas of a display are provided. The display may include a front area disposed on the front surface of the electronic device and a plurality of side areas which include curved areas bent from outer side surfaces of the front area.

According to an embodiment, a method and electronic device for interacting between a plurality of areas of a display are provided. The method and electronic device may identify and perform a function of the electronic device corresponding to a touch input (e.g., at least one touch input) received from at least one of a plurality of side areas of the display based on a grip type which is identified based on a grip input (e.g., first inputs) to the display.

Figure 1:
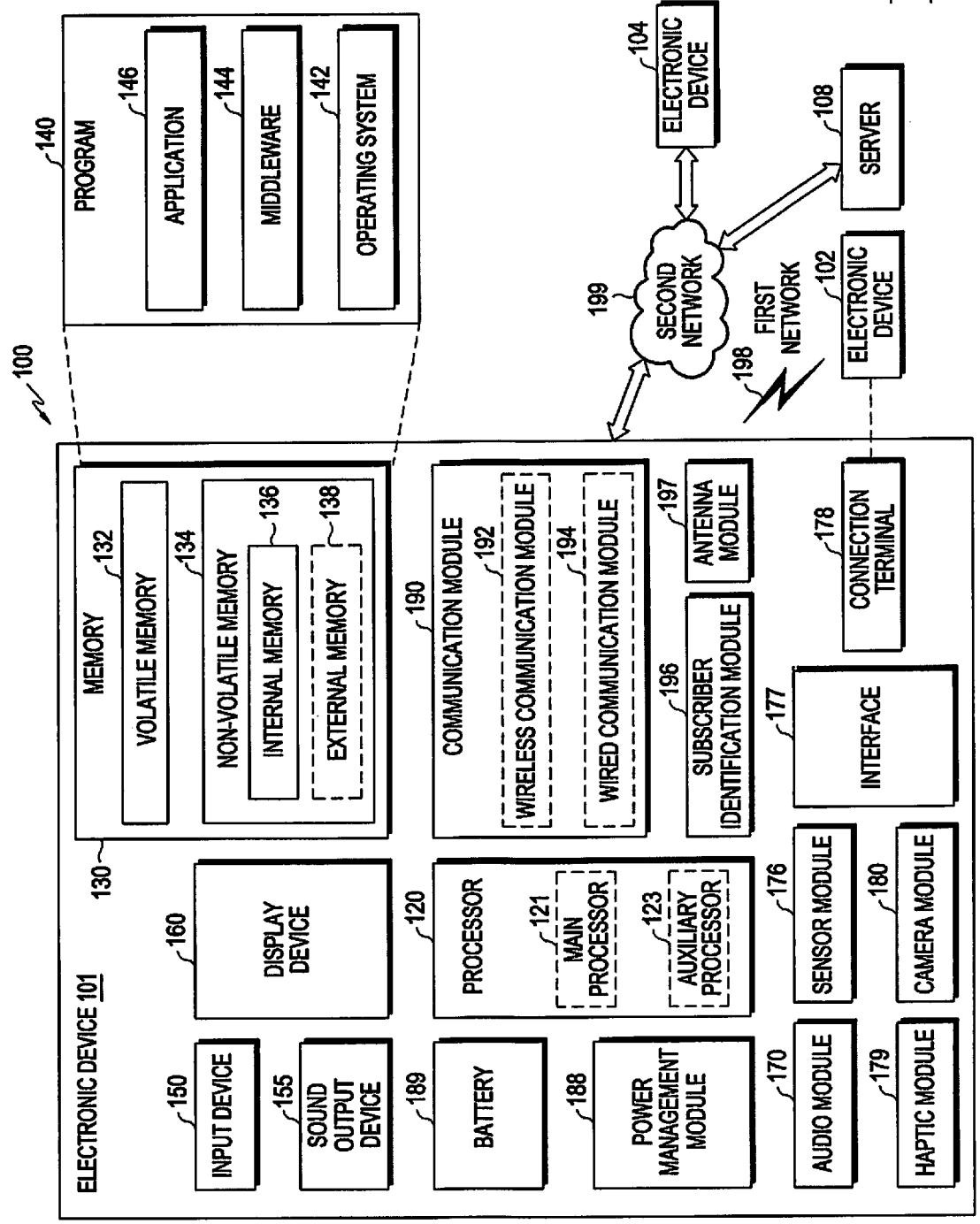
FIG. 1 is a block diagram illustrating an electronic device in a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
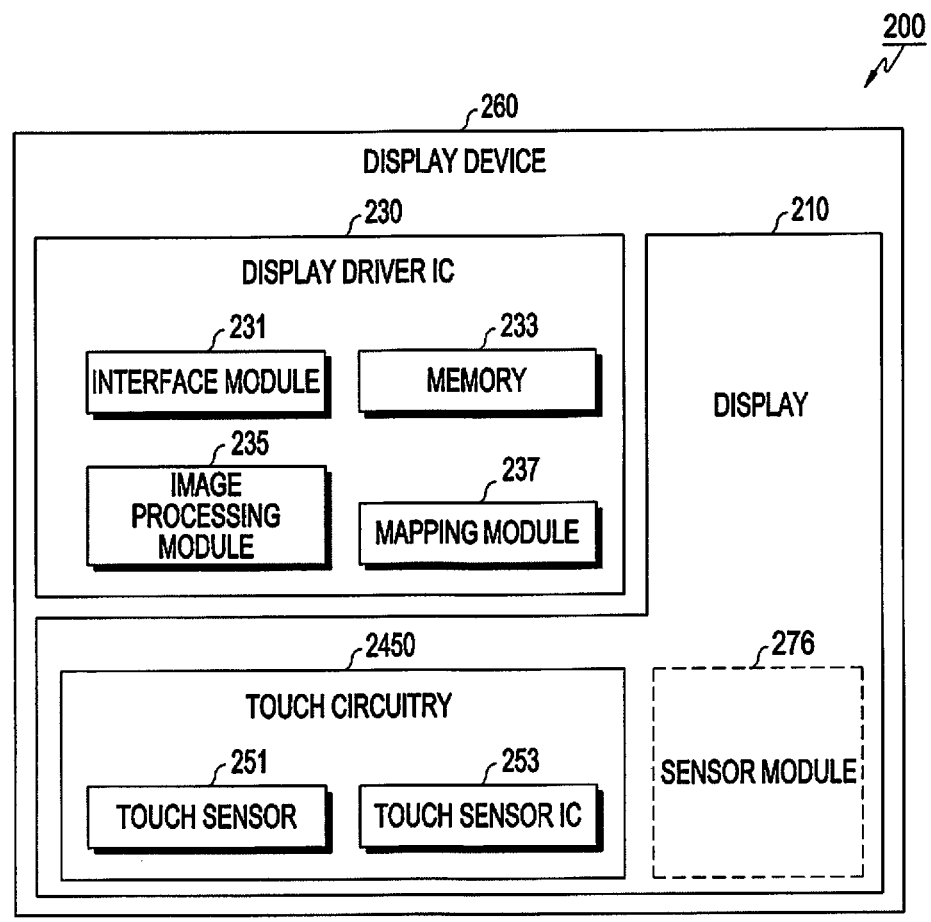
FIG. 2 is a block diagram illustrating a display device, according to an embodiment.

FIG. 2 is a block diagram 200 illustrating the display device 160, according to an embodiment.

Referring to FIG. 2, the display device 160 may include a display 210 and a display driver integrated circuit (DDI) 230 to control the display 110. The DDI 230 may include an interface module 231, a memory 233 (e.g., a buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., an AP) or the auxiliary processor 123 (e.g., a GPU) operated independently from the function of the main processor 121. The DDI 230 may communicate with, for example, touch circuitry 250 or the sensor module 176 via the interface module 231. The DDI 230 may also store at least part of the received image information in the memory 233 on a frame by frame basis. The image processing module 235 may perform pre-processing or post-processing (e.g., adjustment of resolution, brightness, or size) with respect to at least part of the image data. According to an embodiment, the pre-processing or post-processing may be performed based at least in part on one or more characteristics of the image data or one or more characteristics of the display 210. The mapping module 237 may generate a voltage value or a current value corresponding to the image data pre-processed or post-processed by the image processing module 135. According to an embodiment, the generating of the voltage value or current value may be performed based at least in part on one or more attributes of the pixels (e.g., an array, such as a red green blue (RGB) stripe or a pentile structure, of the pixels, or the size of each subpixel) of the display 210. At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 151. The touch sensor IC 253 may control the touch sensor 251 to sense a touch input or a hovering input with respect to a certain position on the display 210. To achieve this, for example, the touch sensor IC 253 may detect (e.g., measure) a change in a signal (e.g., a voltage, a quantity of light, a resistance, or a quantity of one or more electric charges) corresponding to the certain position on the display 210. The touch sensor IC 253 may provide input information (e.g., a position, an area, a pressure, or a time) indicative of the touch input or the hovering input detected to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210.

When the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3A:
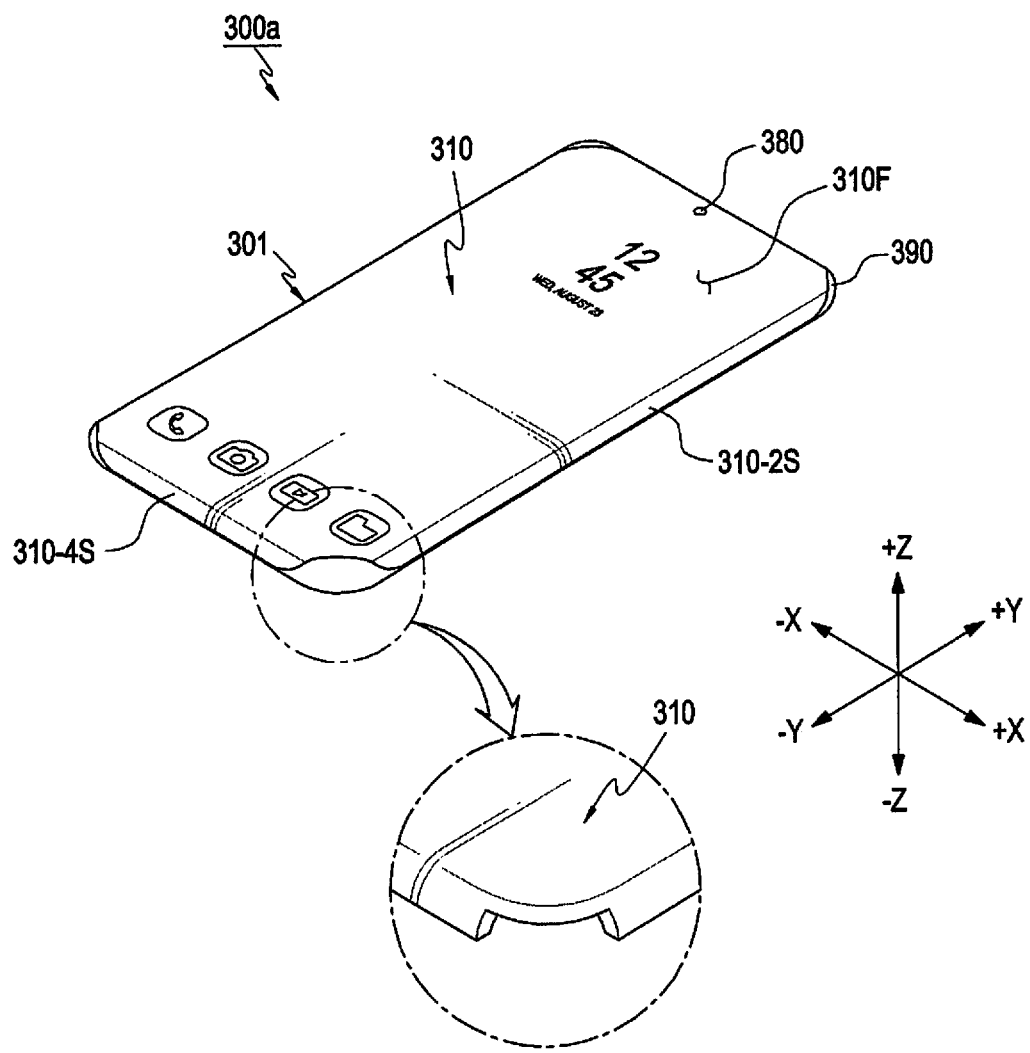
FIG. 3A is a perspective view illustrating an electronic device, according to an embodiment.
Figure 3B:
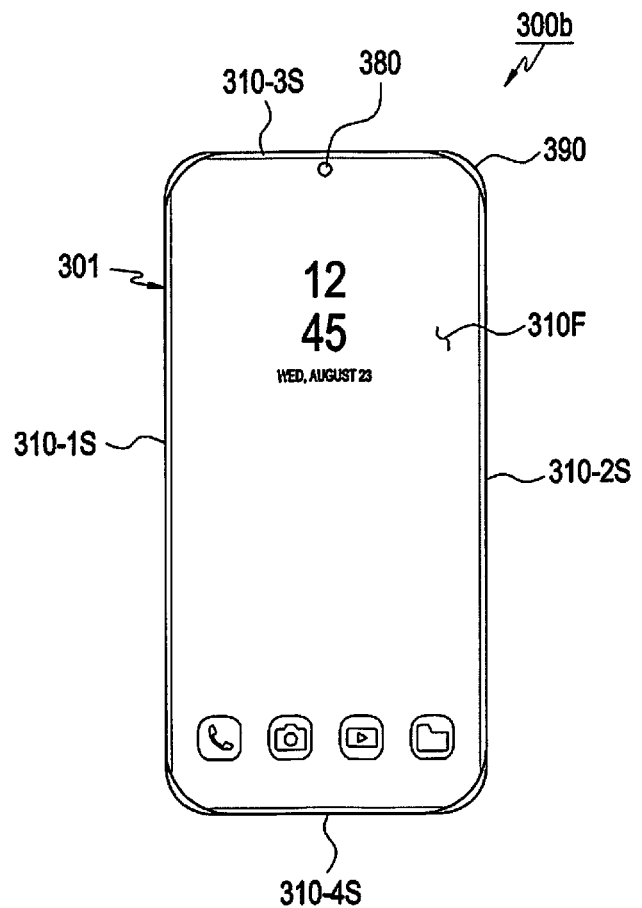
FIG. 3B is a front view illustrating a front surface of the electronic device of FIG. 3A which includes a camera module, according to an embodiment.
Figure 3C:
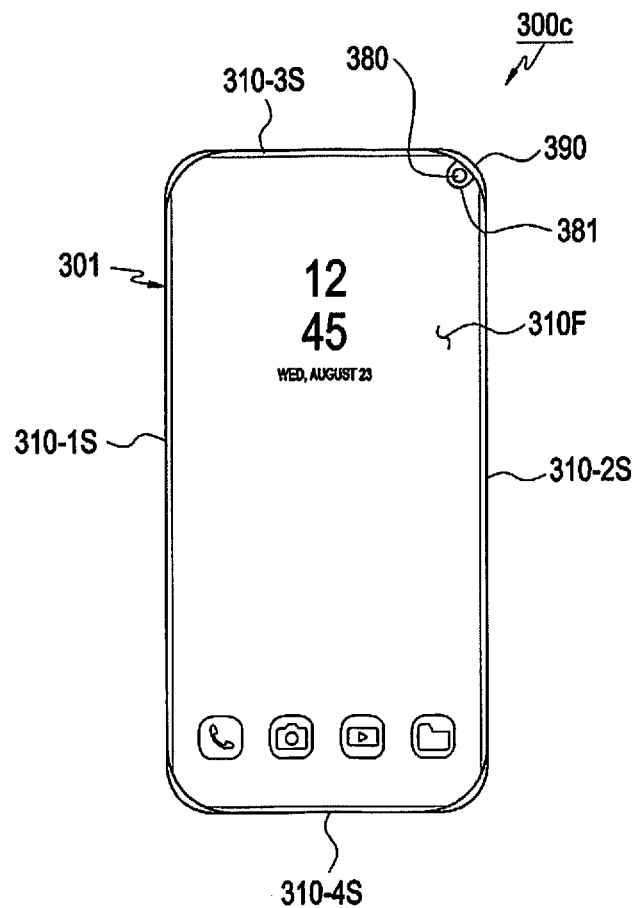
FIG. 3C is a front view illustrating a front surface of the electronic device of FIG. 3A which includes a camera module, according to an embodiment.
Figure 3D:
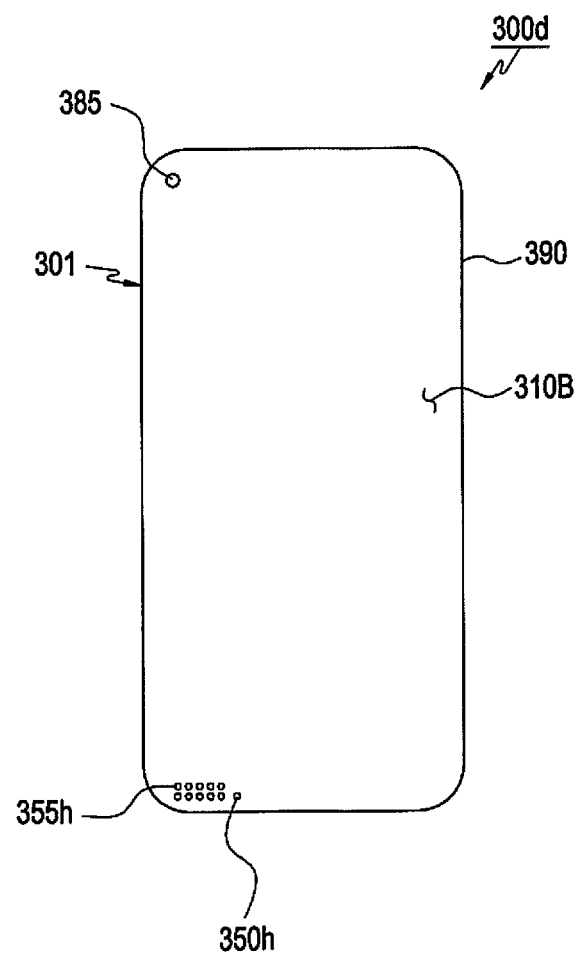
FIG. 3D is a rear view illustrating a rear surface of the electronic device of FIG. 3A, according to an embodiment.

FIG. 3A is a perspective view 300a illustrating an electronic device, according to an embodiment. FIGS. 3B and 3C are front views 300b and 300c illustrating a front surface of the electronic device of FIG. 3A which includes a camera module, according to various embodiments. FIG. 3D is a rear view 300d illustrating a rear surface of the electronic device of FIG. 3A, according to an embodiment. The electronic device 301 of FIGS. 3A to 3D may include the whole or part of the electronic device 101 of FIG. 1 or the whole or part of the electronic device 260 of FIG. 2.

Referring to FIGS. 3A to 3D, according to various embodiments, the electronic device 301 may include a display 310 (e.g., the display device 160 of FIG. 1 or the display device 260 of FIG. 2) including a front area 310F displayed on a first surface (or front surface) of the electronic device 301 and a plurality of side areas 310-1S, 310-2S, 310-3S, and 310-4S disposed on side surfaces of the electronic device 301.

The plurality of side areas 310-1S, 310-2S, 310-3S, and 310-4S may be formed to at least partially surround the space between the first surface and a second surface 310B (or rear surface) of the electronic device 301 which faces away from (i.e., opposite to) the first surface. Each side area 310-1S, 310-2S, 310-3S, or 310-4S may include a curved area extending and bent from each edge of the front area 310F. Each side area 310-1S, 310-2S, 310-3S, or 310-4S may be disposed in the space between the first surface 310F and the second surface 310B or be formed to surround at least part of the space. According to an embodiment, each side area 310-1S, 310-2S, 310-3S, or 310-4S may have a designated radius-of-curvature (R). The designated radius-of-curvature (R) may be varied depending on the design of the electronic device 301.

According to an embodiment, the plurality of side areas may include at least two of a first side area 310-1S (e.g., a left side area), a second side area 310-2S (e.g., a right side area), a third side area 310-3S (e.g., an upper side area), and a fourth side area 310-4S (e.g., a lower side area).

The first side area 310-1S may include a first curved area extending from a first edge (e.g., a left edge) of the front area 310F and bent at a designated radius-of-curvature (R) and be disposed in the space between the first edge and the second surface 310B or formed to surround at least part of the space. The second side area 310-2S may include a second curved area extending from a second edge (e.g., a right edge) of the front area 310F and bent at the designated R and be disposed in the space between the second edge and the second surface 310B or formed to surround at least part of the space. The third side area 310-3S may include a third curved area extending from a third edge (e.g., a top edge) of the front area 310F and bent at the designated R and be disposed in the space between the third edge and the second surface 310B or formed to surround at least part of the space. The fourth side area 310-4S may include a fourth curved area extending from a fourth edge (e.g., a bottom edge) of the front area 310F and bent at the designated R and be disposed in the space between the fourth edge and the second surface 310B or formed to surround at least part of the space.

According to an embodiment, as the plurality of side areas 310-1S, 310-2S, 310-3S, and 310-4S are bent to at least partially surround the side surfaces of the electronic device 301, the respective portions of the side areas corresponding to the edges may be removed, and the removed portions may be formed to be surrounded by the housing 390.

According to an embodiment, a front camera module 380 (e.g., the camera module 180) may be disposed on the first surface of the electronic device 301. According to an embodiment, the front camera module 380 may be a hole-type camera module which is mounted in a hole formed in a portion of the front area 410F as shown in FIG. 3B. Although FIG. 3B illustrates an example in which the front camera module 380 is disposed at the top center of the display 310, embodiments of the disclosure are not limited thereto, and the front camera module 380 may be disposed at the top left or top right of the display 310. According to an embodiment, the front camera module 380 may be a notch-type camera module mounted in a notch 381 formed in a portion of the front area 310F as shown in FIG. 3C. According to an embodiment, the front camera module 380 is shown to be a hole-type camera module as shown in FIG. 3B.

According to an embodiment, various hardware components (e.g., hardware terminals or buttons) may be disposed on the rear surface 310B of the electronic device 301. According to an embodiment, at least one of a rear camera module 385 (e.g., the camera module 180 of FIG. 1) formed in a portion of the housing 390 of the rear surface 310B, a speaker hole 355h of a sound output device (e.g., the sound output device 155 of FIG. 1), or a microphone hole 350h of an input device (e.g., the input device 150 of FIG. 1) may be formed in the rear surface 310B of the electronic device 301 as shown in FIG. 3D. According to an embodiment, a universal subscriber identification module (USIM) terminal may be disposed on the rear surface 310B of the electronic device 301.

According to an embodiment, the modules may be embedded in the electronic device 301 or may be replaced in a digital or wireless manner to minimize a USIM terminal, a charging terminal, an earphone connection terminal, a power button, a home button, a capturing button, volume buttons, or other various hardware terminals or buttons. According to an embodiment, the electronic device 301 may exclude the USIM terminal which may be formed outside the electronic device 301, and the rear surface of the electronic device 301 may be designed so that the USIM module (e.g., the SIM 196 of FIG. 1) is embedded inside the rear surface 310B in the form of a chipset. According to an embodiment, the electronic device 301 may exclude the charging terminal or earphone connection terminal (e.g., the connection terminal 178 of FIG. 1) which may be formed outside the electronic device 301 and may use a wireless charging scheme via a wireless charging module embedded in the electronic device 301 to charge the electronic device 301 or use a wireless communication scheme via a wireless communication module (e.g., the wireless communication module 192 of FIG. 1) embedded in the electronic device 301 to transmit output signals or data from an audio module (e.g., the audio module 170 of FIG. 1) or sound output device (e.g., the sound output device 155 of FIG. 1) of the electronic device 301 to an external device (e.g., the electronic device 102 or 104 or the server 108 of FIG. 1). According to an embodiment, the electronic device 301 may exclude hardware buttons including the power button, home button, capturing button, or volume buttons which may be formed outside the electronic device 301 and may replace the buttons with digital software buttons via software (e.g., the program 140) stored in the memory (e.g., the memory 130 of FIG. 1) of the electronic device 301.

Figure 4:
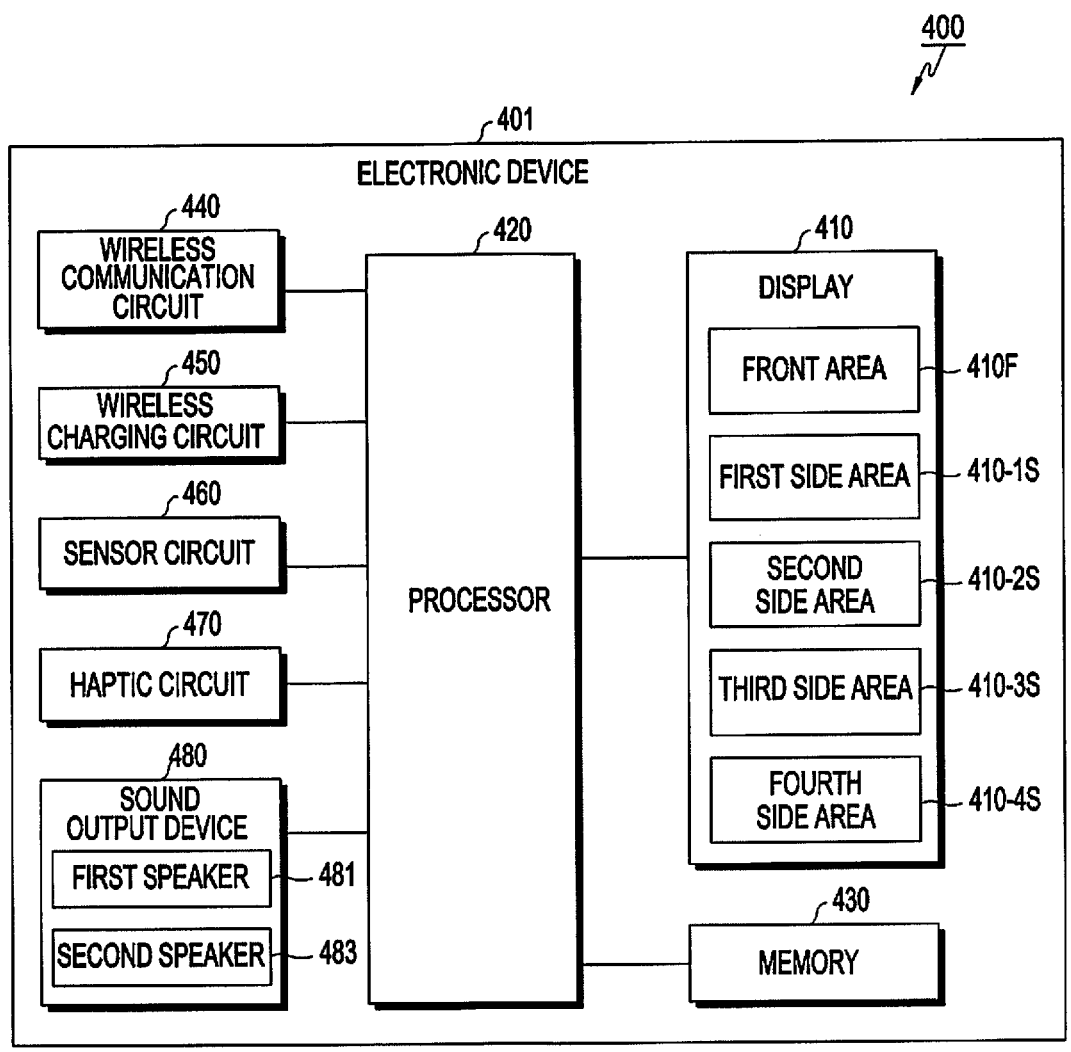
FIG. 4 is a block diagram illustrating an electronic device, according to an embodiment.

FIG. 4 is a block diagram 400 illustrating an electronic device, according to an embodiment.

Referring to FIG. 4, an electronic device 401 may include at least one of a display 410, a processor 420, a memory 430, a wireless communication circuit 440, a wireless charging circuit 450, a sensor circuit 460, a haptic circuit 470, or a sound output device 480. FIG. 4 only illustrates components related to embodiments of the disclosure. The electronic device of FIG. 4 may include components other than those shown in FIG. 4. For example, the electronic device 401 of FIG. 4 may include the whole or part of the electronic device 101 of FIG. 1, the whole or part of the display device 260 of FIG. 2, or the whole or part of the electronic device 301 of FIGS. 3A to 3D.

The display 410 (e.g., the display device 160 of FIG. 1, the display device 260 of FIG. 2, or the display 310 of FIG. 3) may include a plurality of areas. According to an embodiment, the display 410 may include a front area 410F (e.g., the front area 310F of FIG. 3) disposed on a first surface (or front surface) of the electronic device 401 and a plurality of side areas 410-1S, 410-2S, 410-3S, and 410-4S (e.g., the plurality of side areas 310-1S, 310-2S, 310-3S, and 310-4S of FIG. 3) disposed on the side surfaces of the electronic device 401.

According to an embodiment, the plurality of side areas may include, e.g., a first side area 410-1S (e.g., 310-1S of FIGS. 3A to 3D) (e.g., a left side area), a second side area 410-2S (e.g., 310-2S of FIGS. 3A to 3D) (e.g., a right side area), a third side area 410-3S (e.g., 310-3S of FIGS. 3A to 3D) (e.g., an upper side area), or a fourth side area 410-4S (e.g., a lower side area) (e.g., 310-4S of FIGS. 3A to 3D).

The memory 430 (e.g., the memory 130 of FIG. 1) may store at least one user interface (UI) element corresponding to each area 410F, 410-1S, 410-2S, 410-3S, and 410-4S of the display 410 based on the operation state of the electronic device 401. According to an embodiment, the at least one UI element may include at least one of menus, icons, buttons, or objects. The objects may include texts, images, documents, videos, sound music files, or other multimedia files or data. The memory 430 may store information about a plurality of grip types for the electronic device 401. According to an embodiment, the information may include a plurality of grip types previously stored, information about a grip input corresponding to each grip type, or electronic device direction (or posture) information corresponding to each grip type. According to an embodiment, the grip input may include touch inputs (e.g., first touch inputs) received from at least two of the plurality of side areas 410F, 410-1S, 410-2S, 410-3S, and 410-4S. The term "grip input" as used below, may be interchangeably used with the term "first touch input(s)". According to an embodiment, the plurality of pre-stored grip types may include at least one of, a first grip type (e.g., a left-hand grip), a second grip type (e.g., a right-hand grip), or a third grip type (e.g., a both-hand grip). The plurality of pre-stored grip types may include at least one of a first direction left-hand grip, a first direction right-hand grip, a first direction both-hand grip, a second direction left-hand grip, a second direction right-hand grip, or a second direction both-hand grip.

According to an embodiment, the first direction may be the direction of the short axis (or direction of width) of the electronic device 401 or the direction of a first axis (hereinafter, an x axis) (e.g., a portrait direction), and the second direction may be the direction of the longer axis or the direction of a second axis (hereinafter, a "y axis") (e.g., a landscape direction). According to an embodiment, when the electronic device 401 is positioned so that the front area 410F faces the user, and the electronic device 401 is in the first direction (e.g., the portrait direction), it is assumed that the first side area 410-1S corresponds to the left side surface of the user, and the second side area 410-2S corresponds to the right side surface of the user. When the electronic device 401 is in the second direction (e.g., the landscape direction) in the above position of the electronic device 401, it is assumed that the third side area 410-3S corresponds to the left side surface of the user and the fourth side area 410-4S corresponds to the right side surface of the user.

According to an embodiment, each of the plurality of pre-stored grip types may be further divided depending on the position or strength of grip corresponding to the grip input. In the case of the first direction left-hand grip among the pre-stored grip types, the grip position corresponding to the grip input is a first area (e.g., an upper portion) or second area (e.g., a lower portion) of the side areas and may thus be further divided into a first direction upper left-hand grip or a first direction lower left-hand grip. In the case of the first direction left-hand grip among the pre-stored grip types, the grip strength corresponding to the grip input is a first strength or second strength and may thus be further divided into a first direction first strength left hand grip or first direction second strength left-hand grip.

According to an embodiment, the information about the grip input corresponding to each grip type may include information about the grip type determination condition corresponding to each grip type. The information about the grip type determination condition may include information about at least one reference range of at least one of the number, coordinates, shape, pattern, or size of the first touch inputs corresponding to each grip input.

The wireless communication circuit 440 (e.g., the wireless communication module 192 of FIG. 1) may wirelessly transmit or receive signals or data without connection by a separate communication connector with an external device (e.g., the electronic device 102 or 104 or the server 108 of FIG. 1). According to an embodiment, the wireless communication circuit 440 may wirelessly transmit signals or data output from the audio module (e.g., the audio module 170 of FIG. 1) or sound output device 460 (e.g., the sound output device 155 of FIG. 1) of the electronic device 401 to an external device 102, 104, or 108 (e.g., a wireless earphone).

The wireless communication circuit 450 may wirelessly transmit or receive power to/from the external device 102, 104, or 108 without connection via a separate charging connector. According to an embodiment, the wireless communication circuit 450 may include a wireless charging circuit by at least one of an electromagnetic induction scheme using a coil, a resonance scheme using resonance, or a radio frequency (RF) or microwave radiation scheme to convert electrical energy into a microwave and transfer the microwave.

The sensor circuit 460 (e.g., the sensor module 176 of FIG. 1) may detect the operation state or external environmental state of the electronic device 401. According to an embodiment, the sensor circuit 460 may identify the direction (or posture) of the electronic device 406 using a gyro sensor, accelerometer, or geo-magnetic sensor. The identified direction of the electronic device 401 may be used to identify the grip type for the electronic device 401. According to an embodiment, the sensor circuit 460 may obtain the grip position or grip strength corresponding to the grip input of the electronic device 401 via a grip sensor, proximity sensor, or pressure sensor. The grip position obtained via the sensor circuit 460 may include the grip position, proximity position, pressure position, or a combination thereof, corresponding to the grip input. The grip strength obtained via the sensor circuit 460 may include the grip strength, pressure position, or a combination thereof, corresponding to the grip input.

The haptic circuit 470 (e.g., the haptic module 179 of FIG. 1) may provide a tactile feedback based on the identified grip type. For example, the haptic module 470 may provide various tactile feedbacks to the user based on the grip type corresponding to the grip input. According to an embodiment, a plurality of tactile feedbacks corresponding to the plurality of grip types for the electronic device 401 may be stored in the memory 430. The electronic device 401 may provide a different tactile feedback according to each grip type.

The sound output device 480 (e.g., the sound output device 155 of FIG. 1) may include a first speaker 481 or a second speaker 483. According to an embodiment, the first speaker 481 may include a speaker or receiver, such as a dynamic driver or balanced armature driver, and the second speaker 483 may include a speaker or receiver, such as a piezo ceramic driver. According to an embodiment, the second speaker 483, such as a piezo ceramic driver may be used as a main speaker or assistant speaker by adjusting its magnitude of output. For example, when the second speaker 483, such as a piezo ceramic driver, is used as the main speaker, the output may be at a first magnitude and, when used as an assistant speaker, the output may be at a second magnitude which is smaller than the first magnitude.

The processor 420 (e.g., the processor 120 of FIG. 1) may be electrically or operatively connected with the display 410, the memory 430, the wireless communication circuit 440, the wireless charging circuit 450, the haptic circuit 470, or the sound output device 480, exchanging signals (e.g., commands or data) with them.

According to an embodiment, the processor 420 may receive the grip input for the display 410. According to an embodiment, the processor 420 may receive the grip input including first touch inputs for grips on at least two of the plurality of side areas 410-1S, 410-2S, 410-3S, and 410-4S.

According to an embodiment, the processor 420 may identify the grip type based on the grip input. For example, the processor 420 may identify the grip type for the electronic device 401 based on the first touch inputs.

According to an embodiment, the grip input may include the grip position or grip strength corresponding to the grip input. The grip position corresponding to the grip input may include touch positions, grip positions, pressure positions, or combinations thereof, individually corresponding to the first touch inputs. The grip strength corresponding to the grip input may include touch strengths, grip strengths, pressure positions, or combinations thereof, individually corresponding to the first touch inputs.

According to an embodiment, the grip type for the electronic device 401 may include at least one of a first grip type (e.g., a left-hand grip), a second grip type (e.g., a right-hand grip), or a third grip type (e.g., a both-hand grip). According to an embodiment, the grip type for the electronic device 401 may be further divided depending on the direction (or posture) of the electronic device 401. For example, the grip type for the electronic device 401 may include at least one of a first grip type (e.g., a first direction left-hand grip), a second grip type (e.g., a first direction right-hand grip), or a third grip type (e.g., a first direction both-hand grip) while the electronic device 401 is in a first direction (e.g., the portrait direction) or at least one of a first grip type (e.g., a second direction left-hand grip), a second grip type (e.g., a second direction right-hand grip), or a third grip type (e.g., a second direction both-hand grip) while the electronic device 401 is in a second direction (e.g., the landscape direction). According to an embodiment, the grip type for the electronic device 401 may be further divided depending on the grip position or grip strength corresponding to the grip input.

According to an embodiment, the processor 420 may identify (or determine) the grip type for the electronic device 401 based on at least one of the numbers, coordinates, shapes, patterns, or sizes of the first touch inputs. For example, upon receiving a first touch input from a first side (or left) area 410-1S and one or more touch inputs from the second side (or right) area 410-2S facing away from the first area 410-1S, the processor 420 may identify that the grip type for the electronic device 401 is a first grip type (e.g., left-hand grip). For example, when the first touch inputs are received while the electronic device 401 is in the first direction, the processor 420 may identify that the grip type for the electronic device 401 is a first direction first grip type (e.g., a first direction left-hand grip). For example, when the same number of first touch inputs are received from the first side (or left) area 410-1S and the second side (or right) area 410-2S, the processor 420 may compare the shapes, patterns, or sizes of the first touch inputs and identify one of a plurality of grip types previously stored for the electronic device 401.

According to an embodiment, the processor 420 may further receive grip signals, proximity signals, or pressure signals corresponding to the first touch inputs through the sensor circuit 460. The processor 420 may identify the grip type for the electronic device 401 based on the grip signals (e.g., grip positions or grip strengths), first proximity signals (e.g., proximity positions), pressure signals (e.g., pressure positions or pressure strengths), or combinations thereof, corresponding to the first touch inputs, as well as the first touch inputs.

According to an embodiment, the processor 420 may provide a tactile feedback through the haptic circuit 470 based on the identified grip type. The processor 420 may provide other tactile feedback according to the grip type. For example, when the electronic device 401 is gripped in a designated grip type, and a screen of a designated operation state (e.g., locked state, idle state, or execution state of a particular application) of the electronic device 401 is preset to be displayed on the display 410, the user may intuitively recognize whether it has been gripped precisely in the designated grip type through the tactile feedback which differs per grip type.

According to an embodiment, the processor 420 may receive a touch input for at least one of a plurality of side areas 410-1S, 410-2S, 410-3S, and 410-4S, with the electronic device 401 gripped. According to an embodiment, the touch input may include at least one touch input (e.g., the second touch input) received from at least one of the plurality of side areas 410-1S, 410-2S, 410-3S, and 410-4S while the identified grip type is maintained (e.g., while at least some of the first touch inputs corresponding to the grip input are maintained). The term "touch input" may be interchangeably used with the term "second touch input".

According to an embodiment, based on the identified grip type, the processor 420 may deactivate at least two side areas (e.g., 410-1S and 410-2S) where the first touch inputs are received among the plurality of side areas 410-1S, 410-2S, 410-3S, and 410-4S and receive the touch input (e.g., at least one second touch input) from at least one side area (e.g., 410-3S or 410-4S) neighboring the at least two deactivated side areas (e.g., 410-1S and 410-2S).

According to an embodiment, based on the identified grip type, the processor 420 may deactivate the first areas corresponding to the positions of the first touch inputs in the side area 410-1S or 410-2S for each of the at least two side areas (e.g., 410-1S and 410-2S) where the first touch inputs are received among the plurality of side areas 410-1S, 410-2S, 410-3S, and 410-4S based on the identified grip type and receive the at least one second touch input from at least one of the other areas (e.g., second areas) different than the deactivated first areas.

According to an embodiment, the processor 420 may activate at least one third area in at least one side area 410-1S, 410-2S, 410-3S, or 410-4S based on the identified grip type and receive the at least one second touch input from the at least one activated third area.

According to an embodiment, the touch input (e.g., at least one second touch input) may include various touch gestures. For example, the at least one second touch input may include at least one of a touch down and touch up, a tap, a double tap, a drag, a drag-and-drop, a swipe, or a flick. According to an embodiment, the at least one second touch input may include a single input or a continuous input. According to an embodiment, the at least one second touch input may include simultaneous inputs received from at least two side areas. According to an embodiment, the at least one second touch input may include simultaneous inputs received from the second areas or at least one third area. According to an embodiment, the processor 420 may identify the function corresponding to the touch input (e.g., at least one second touch input) based on the identified grip type. For example, the processor 420 may identify the function corresponding to the touch input (e.g., at least one second touch input) among the plurality of functions of the electronic device 401. The plurality of functions may include a plurality of operations performed by the electronic device 401. The term "function" may be interchangeably used with the term "operation."

According to an embodiment, the processor 420 may perform a first function corresponding to the touch input when the identified grip type is a first type. The processor 420 may perform a second function corresponding to the touch input when the identified grip type is a second type.

According to an embodiment, the processor 420 may identify the operation state of the electronic device based on the identified grip type, identify at least one function among a plurality of functions of the electronic device based on the identified operation state, and perform the at least one identified function in response to the reception of the touch input (e.g., at least one second touch input).

According to an embodiment, the operation state of the electronic device 401 may include a locked state, an idle state, a setting mode (e.g., an airplane mode) state, or an application execution state. Besides, the electronic device 401 may further include other various operation states.

According to an embodiment, the processor 420 may identify at least one function based on the identified operation state. For example, the processor 420 may identify at least one function related to the identified operation state among the plurality of functions that the electronic device 401 supports.

According to an embodiment, the processor 420 may perform the at least one identified function in response to the reception of the touch input. For example, the processor 420 may receive the touch input (e.g., at least one second touch input) from at least one of the plurality of areas while the identified grip type is maintained (e.g., while some of the first touch inputs are maintained). The electronic device 401 may perform the at least one identified function in response to the reception of the touch input.

According to an embodiment, the processor 420 may perform at least one function of selecting, moving, or executing at least one UI element displayed according to the identified grip type in the identified operation state in response to the reception of the touch input (e.g., at least one second touch input). The electronic device 401 may identify at least one UI element corresponding to the front area (e.g., 410F) of the display 410 or each side area 410-1S, 410-2S, 410-3S, or 410-4S based on the identified operation state. For the UI elements, e.g., a display position, a display direction, a display shape, or a display size may be preset.

The electronic device 401 may change the preset display position, display direction, display shape, or display size based on the identified grip type and display it on the display 410.

According to an embodiment, the processor 420 may activate at least part of the front area 410F displayed on the display 410 according to the identified grip type in the identified operation state in response to the reception of the touch input (e.g., the at least one second touch input). For example, the processor 420 may activate a left end area of a designated size from a first edge (e.g., the left edge) of the front area 410F in response to the reception of the touch input (e.g., at least one second touch input) from the first side (or left) area 410-1S among the plurality of side areas 410-1S, 410-2S, 410-3S, and 410-4S while the identified grip type is maintained (e.g., while at least some of the first touch inputs are maintained).

The processor 420 may activate a right end area of a designated size from a second edge (e.g., the right edge) of the front area 410F in response to the reception of the touch input (e.g., at least one second touch input) from the second side (or right) area 410-2S among the plurality of side areas 410-1S, 410-2S, 410-3S, and 410-4S while the identified grip type is maintained. The processor 420 may activate an upper end area of a designated size from a third edge (e.g., the top edge) of the front area 410F in response to the reception of the touch input (e.g., at least one second touch input) from the third side (or upper) area 410-3S among the plurality of side areas 410-1S, 410-2S, 410-3S, and 410-4S while the identified grip type is maintained. The processor 420 may activate a lower end area of a designated size from a fourth edge (e.g., the bottom edge) of the front area 410F in response to the reception of the touch input (e.g., at least one touch input) from the fourth side (or lower) area 410-4S among the plurality of side areas 410-1S, 410-2S, 410-3S, and 410-4S while the identified grip type or grip position is maintained. According to an embodiment, the left end, right end, upper end, or lower end area activated in the front area 410F may be displayed overlaid on the front area 410F in a popped-up form.

According to an embodiment, when the designated state (e.g., the locked state, idle state, setting mode (e.g., airplane mode) state, or application execution state) of the electronic device 410 is set according to the designated grip type, the processor 420 may control the display 410 based on the designated state of the electronic device 401 in response to the reception of the grip input (e.g., first touch inputs) corresponding to the designated grip type from the processor 420. For example, in the electronic device 401, a first state (e.g., a first idle state) of the electronic device 401 may be designated corresponding to a designated first grip type, and a second state (e.g., a second idle state) of the electronic device 401 may be designated corresponding to a designated second grip type. The processor 420 may display a first screen (e.g., a first idle screen (e.g., a representative page or first page of the home screen) corresponding to the designated first state (e.g., the first idle state) on the display 410 in response to the reception of the grip input (e.g., first touch inputs) corresponding to the designated first grip type from at least two of the plurality of side areas 410-1S, 410-2S, 410-3S, and 410-4S. The processor 420 may display a second screen (e.g., a second idle screen (e.g., the second page of the home screen or another home screen) corresponding to the designated second state (e.g., the second idle state) on the display 410 in response to the reception of the grip input (e.g., first touch inputs) corresponding to the designated second grip type from at least two of the plurality of side areas 410-1S, 410-2S, 410-3S, and 410-4S. According to an embodiment, the processor 420 may control at least one UI element displayed on the display 410 according to the identified grip type in the identified operation state in response to the reception of the at least one second touch input, with the electronic device 401 gripped. According to an embodiment, the at least one UI element may include at least one of menus, icons, buttons, or objects (e.g., images, videos, or multimedia). According to an embodiment, the processor 420 may select, move, or resize the at least one UI element or perform the function designated to the at least one front UI element based on the reception of the touch input (e.g., at least one second touch input).

According to an embodiment, the processor 420 may perform at least one function of the application displayed on the display 410 according to the identified grip type in the identified operation state in response to the reception of the touch input (e.g., at least one second touch input). For example, the processor 420 may identify the application or at least one function of the application displayed on the front area 410F or each side area 410-1S, 410-2S, 410-3S, or 410-4S of the display 410 based on the identified operation state. For example, at least one function (e.g., zooming, volume-control, or execution screen control functions) may be preset for the application. The processor 420 may display the identified application or at least one function of the identified application in response to the reception of the touch input (e.g., at least one second touch input).

According to an embodiment, the processor 420 may control the zooming function of the application displayed on the display 410 according to the identified grip type in the identified operation state. For example, when the application is a camera application, the processor 420 may adjust the zoom-in or zoom-out of the preview image received from the camera module (e.g., the camera module 180 of FIG. 1 or the camera module 380 of FIGS. 3A to 3D) in response to the reception of the touch input (e.g., at least one second touch input).

According to an embodiment, the processor 420 may control the volume control function of the application displayed on the display 410 according to the identified grip type in the identified operation state. For example, when the application is an application for playing music, video, or other multimedia data, the processor 420 may adjust the volume of the multimedia data being played on the application in response to the reception of the touch input (e.g., at least one second touch input).

According to an embodiment, the processor 420 may control the function related to the application execution screen displayed on the display 410 according to the identified grip type in the identified operation state. For example, when the application is an application for playing music, video, or other multimedia data, the processor 420 may control the size, direction, or color of the execution screen of the application playing the multimedia data in response to the reception of the touch input (e.g., at least one second touch input). When a scroll occurs on the execution screen of the application (e.g., an album application or browser application), the processor 420 may control the scroll of the execution screen displayed on the display 410 in response to the reception of the touch input (e.g., at least one second touch input) and perform display the execution screen which scrolls based on the scroll control.

According to an embodiment, the processor 420 may perform different functions depending on types, positions, or counts (i.e., a number) of the touch input (e.g., at least one second touch input). For example, in a case where the application (e.g., a video application) being executed is displayed on the display 410 based on the identified grip type in the identified operation state, if a first type (e.g., swipe) of second touch input is received, the processor 420 may adjust the first function (e.g., volume control) of the application according to the position, moving distance, or count of the first type of second touch input and, when a second type (e.g., tap or double-tap) of second touch input is received, the processor 420 may adjust the second function (e.g., the function of adjusting the size, direction, or color of the execution screen) of the application according to the position, moving distance, or count of the second type of second touch input. For example, in a case where the application (e.g., video application) being executed is displayed on the display 410 based on the identified grip type in the identified operation state, if the touch input (e.g., at least one second touch input) is received from one side area (e.g., 410-1S), the processor 420 may adjust the first function (e.g., volume control function) of the application and, if the touch input (e.g., at least one second touch input) is received from another side area (e.g., 410-1S, 410-2S, or 410-4S), the processor 420 may adjust the second function (e.g., the function of adjusting the size, direction, or color of the execution screen) of the application.

The processor 420 is described below in greater detail with reference to FIGS. 5 to 15, according to various embodiments.

Figure 5:
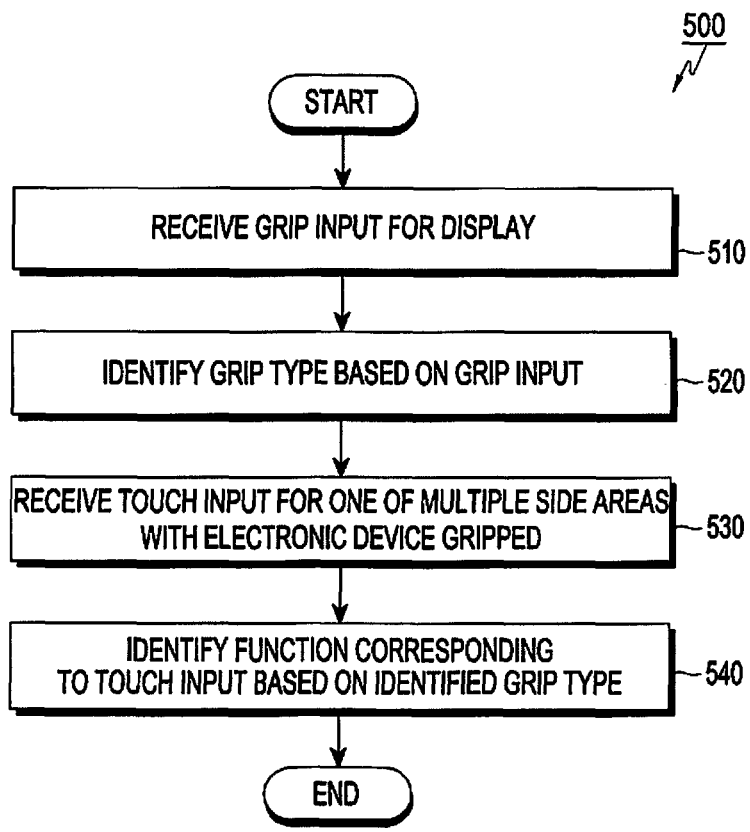
FIG. 5 is a flowchart illustrating a method for interacting between a plurality of areas of a display included in an electronic device, according to an embodiment.

FIG. 5 is a flowchart 500 illustrating a method for interacting between a plurality of areas of a display included in an electronic device, according to an embodiment. The method may be performed by at least one of an electronic device (e.g., the electronic device 401) or a processor (e.g., the processor 420) of the electronic device 401. According to an embodiment, at least one of operations 510 to 540 may be omitted, or some operations may be performed in a different order, or other operations may be added.

In operation 510, the electronic device 401 may receive a grip input for a display (e.g., the display 410) included in the electronic device 401. For example, the electronic device 401 may receive touch inputs (e.g., first touch inputs) from at least two side areas corresponding to the grip input among a plurality of side areas (e.g., the first to fourth side areas 410-1S, 410-2S, 410-3S, and 410-4S) of the display 410.

In operation 520, the electronic device 401 may identify the grip type based on the grip input. For example, the electronic device 401 may identify the grip type for the electronic device 401 based on the first touch inputs corresponding to the grip input.

According to an embodiment, the grip type for the electronic device 401 may include at least one of, e.g., a first grip type (e.g., a left-hand grip), a second grip type (e.g., a right-hand grip), or a third grip type (e.g., both-hand grip). According to an embodiment, the grip type for the electronic device 401 may be further divided depending on the direction (or posture) of the electronic device 401. For example, the grip type for the electronic device 401 may include at least one of a first grip type (e.g., a first direction left-hand grip), a second grip type (e.g., a first direction right-hand grip), or a third grip type (e.g., a first direction both-hand grip) while the electronic device 401 is in a first direction (e.g., the portrait direction) or at least one of a first grip type (e.g., a second direction left-hand grip), a second grip type (e.g., a second direction right-hand grip), or a third grip type (e.g., a second direction both-hand grip) while the electronic device 401 is in a second direction (e.g., the landscape direction). Each of the plurality of pre-stored grip types may be further divided depending on the position or strength of grip corresponding to the grip input. In the case of the first direction left-hand grip among the pre-stored grip types, the grip position corresponding to the grip input is a first area (e.g., an upper portion) or second area (e.g., a lower portion) of the side areas and may thus be further divided into a first direction upper left-hand grip or a first direction lower left-hand grip. In the case of the first direction left-hand grip among the pre-stored grip types, the grip strength corresponding to the grip input is a first strength or second strength and may thus be further divided into a first direction first strength left hand grip or first direction second strength left-hand grip.

According to an embodiment, the electronic device 401 may identify the grip type for the electronic device 401 based on at least one of the numbers, coordinates, shapes, patterns, or sizes of the first touch inputs. For example, upon receiving a first touch input corresponding to the grip input from a first side (or left) area 410-1S and one or more touch inputs corresponding to the grip input from the second side (or right) area 410-2S facing away from the first area 410-1S, the electronic device 401 may identify that the grip type for the electronic device 401 is a first grip type (e.g., left-hand grip). For example, when the first touch inputs are received while the electronic device 401 is in the first direction, the electronic device 401 may identify that the grip type for the electronic device 401 is a first direction first grip type (e.g., a first direction left-hand grip). For example, when the same number of first touch inputs corresponding to the grip input are received from the first side (or left) area 410-1S and the second side (or right) area 410-2S, the electronic device 401 may compare the shapes, patterns, or sizes of the first touch inputs and identify one of a plurality of grip types for the electronic device 401.

According to an embodiment, the electronic device 401 may further receive grip signals, proximity signals, or pressure signals corresponding to the first touch inputs through a sensor circuit (e.g., the sensor circuit 460). The electronic device 401 may identify the grip type for the electronic device 401 based on first grip signals, first proximity signals, first pressure signals, or combinations thereof, corresponding to the first touch inputs, as well as the first touch inputs corresponding to the grip input. The electronic device 401 may further identify the grip strength corresponding to the identified grip type based on the first grip signals, the first pressure signals, or combinations thereof. In operation 530, the electronic device 401 may receive a touch input for at least one of a plurality of side areas 410-1S, 410-2S, 410-3S, and 410-4S, with the electronic device 401 gripped. For example, the electronic device 401 may receive at least one touch input (e.g., the second touch input) from at least one of the plurality of side areas 410-1S, 410-2S, 410-3S, and 410-4S while the identified grip type is maintained (e.g., while at least some of the first touch inputs corresponding to the grip input are maintained).

According to an embodiment, based on the identified grip type, the electronic device 401 may deactivate at least two side areas (e.g., 410-1S and 410-2S) where the first touch inputs are received among the plurality of side areas 410-1S, 410-2S, 410-3S, and 410-4S and receive the at least one second touch input from at least one side area (e.g., 410-3S or 410-4S) neighboring the at least two deactivated side areas (e.g., 410-1S and 410-2S).

According to an embodiment, based on the identified grip type, the electronic device 401 may deactivate the first areas corresponding to the positions of the first touch inputs in the side area 410-1S or 410-2S for each of the at least two side areas (e.g., 410-1S and 410-2S) where the first touch inputs are received among the plurality of side areas 410-1S, 410-2S, 410-3S, and 410-4S based on the identified grip type and receive the at least one second touch input from at least one of the other areas (e.g., second areas) different than the deactivated first areas.

According to an embodiment, the processor 420 may activate at least one third area in at least one side area 410-1S, 410-2S, 410-3S, or 410-4S based on the identified grip type and receive the at least one second touch input from the at least one activated third area.

According to an embodiment, the at least one second touch input may include various touch gestures. For example, the at least one second touch input may include at least one of a touch down and touch up, a tap, a double tap, a drag, a drag-and-drop, a swipe, or a flick. According to an embodiment, the at least one second touch input may include a single input or a continuous input. According to an embodiment, the at least one second touch input may include simultaneous inputs received from at least two side areas. According to an embodiment, the at least one second touch input may include simultaneous inputs received from the second areas or at least two third areas.

In operation 540, the electronic device 401 may identify the function corresponding to the touch input based on the identified grip type. For example, the electronic device 401 may identify the function corresponding to the touch input (e.g., at least one second touch input) among the plurality of functions of the electronic device 401.

According to an embodiment, the processor 420 may perform a first function corresponding to the touch input when the identified grip type is a first type and a second function corresponding to the touch input when the identified grip type is a second type.

According to an embodiment, the processor 420 may identify the operation state of the electronic device based on the identified grip type, identify at least one function among a plurality of functions of the electronic device based on the identified operation state, and perform the at least one identified function in response to the reception of the touch input (e.g., at least one second touch input).

According to an embodiment, the processor 420 may perform at least one function of selecting, moving, or executing at least one user interface (UI) element displayed according to the identified grip type in the identified operation state in response to the reception of the touch input (e.g., at least one second touch input).

According to an embodiment, the processor 420 may perform at least one function of the application displayed on the display 410 according to the identified grip type in the identified operation state in response to the reception of the touch input (e.g., at least one second touch input).

Figure 6:
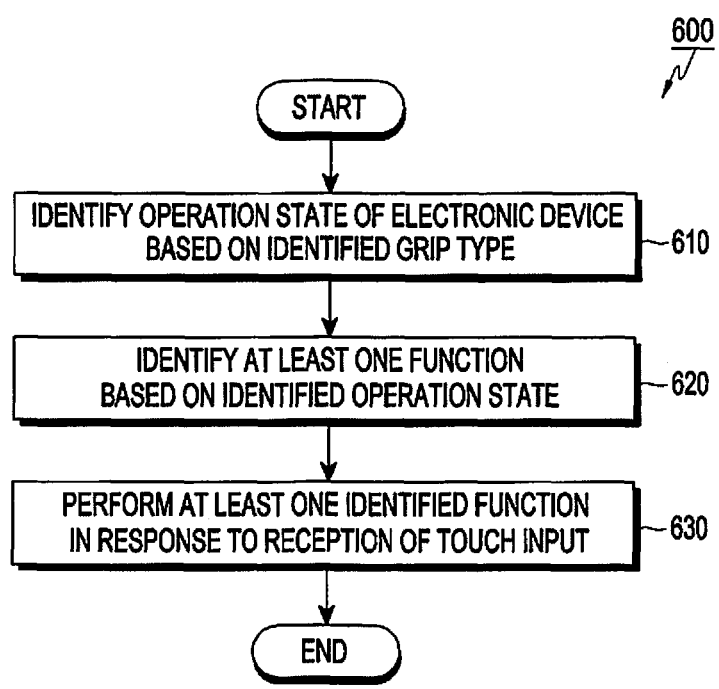
FIG. 6 is a flowchart illustrating a method for interacting between a plurality of areas of a display included in an electronic device, according to an embodiment.

Operation 540 is described below in greater detail with reference to FIG. 6. FIG. 6 is a flowchart 600 illustrating a method for interacting between a plurality of areas of a display included in an electronic device according to an embodiment. FIG. 6 is a flowchart illustrating a method according to operation 540 of FIG. 5. The method may be performed by at least one of an electronic device (e.g., the electronic device 401) or a processor (e.g., the processor 420) of the electronic device 401. According to an embodiment, at least one of operations 610 to 630 may be omitted, or some operations may be performed in a different order, or other operations may be added.

In operation 610, the electronic device 401 may identify the operation state of the electronic device 401 based on the grip type identified for the electronic device 401. The electronic device 401 may identify the grip type based on the grip input (e.g., first touch inputs) received from at least two of the plurality of side areas (e.g., 410-1S, 410-2S, 410-3S, and 410-4S) of the display (e.g., the display 410). The electronic device 401 may identify the operation state of the electronic device 401 when gripped, based on the identified grip input. The electronic device 401 may identify the predesignated operation state corresponding to the identified grip type among the plurality of operation states for the electronic device 401.

According to an embodiment, the operation state of the electronic device 401 may include a locked state, an idle state, a setting mode (e.g., an airplane mode) state, or an application execution state. The electronic device 401 may further include other various operation states.

In operation 620, the electronic device 401 may identify at least one function based on the identified operation state. For example, the electronic device 401 may identify at least one function related to the identified operation state among the plurality of functions that the electronic device 401 supports. In operation 630, the electronic device 401 may perform the at least one identified function in response to the reception of the touch input. The electronic device 401 may receive the touch input (e.g., at least one second touch input) from at least one of the plurality of areas while the identified grip type is maintained. The electronic device 401 may perform the at least one identified function in response to the reception of the touch input.

According to an embodiment, the electronic device 401 may perform at least one function of selecting, moving, or executing at least one UI element displayed according to the identified grip type in the identified operation state in response to the reception of the touch input. For example, the electronic device 401 may identify at least one UI element corresponding to the front area (e.g., 410F) of the display 410 or each side area 410-1S, 410-2S, 410-3S, or 410-4S based on the identified operation state. For the UI elements, e.g., display position, display direction, display shape, or display size may be preset. The electronic device 401 may change the preset display position, display direction, display shape, or display size based on the identified grip type and display it on the display 410.

According to an embodiment, the electronic device 401 may activate at least part of the front area 410F displayed on the display 410 according to the identified grip type in the identified operation state in response to the reception of the at least one second touch input. For example, the electronic device 401 may activate a left end area of a designated size from a first edge (e.g., the left edge) of the front area 410F in response to the reception of the touch input (e.g., at least one second touch input) from the first side (or left) area 410-1S among the plurality of side areas 410-1S, 410-2S, 410-3S, and 410-4S while the identified grip type is maintained (e.g., while at least some of the first touch inputs are maintained). The electronic device 401 may activate a right end area of a designated size from a second edge (e.g., the right edge) of the front area 410F in response to the reception of the touch input (e.g., at least one second touch input) from the second side (or right) area 410-2S among the plurality of side areas 410-1S, 410-2S, 410-3S, and 410-4S while the identified grip type is maintained. The electronic device 401 may activate an upper end area of a designated size from a third edge (e.g., the top edge) of the front area 410F in response to the reception of the touch input (e.g., at least one second touch input) from the third side (or upper) area 410-3S among the plurality of side areas 410-1S, 410-2S, 410-3S, and 410-4S while the identified grip type is maintained. The electronic device 401 may activate a lower end area of a designated size from a fourth edge (e.g., the bottom edge) of the front area 410F in response to the reception of the touch input (e.g., at least one second touch input) from the fourth side (or lower) area 410-4S among the plurality of side areas 410-1S, 410-2S, 410-3S, and 410-4S while the identified grip type or grip position is maintained. According to an embodiment, the left end, right end, upper end, or lower end area activated in the front area 410F may be displayed overlaid on the front area 410F in a popped-up form.

According to an embodiment, when the designated state (e.g., the locked state, idle state, setting mode (e.g., airplane mode) state, or application execution screen) of the electronic device 410 is set according to the designated grip type, the electronic device 401 may control the display 410 based on the designated state of the electronic device 401 in response to the reception of the grip input (e.g., first touch inputs) corresponding to the designated grip type from the processor 420. For example, in the electronic device 401, a first state (e.g., a first idle state) of the electronic device 401 may be designated corresponding to a designated first grip type, and a second state (e.g., a second idle state) of the electronic device 401 may be designated corresponding to a designated second grip type. The processor 420 may display a first screen (e.g., an idle screen (e.g., a representative page or first page of the home screen)) corresponding to the designated first state (e.g., the first idle state) on the display 410 in response to the reception of the grip input (e.g., first touch inputs) corresponding to the designated first grip type from at least two of the plurality of side areas 410-1S, 410-2S, 410-3S, and 410-4S. The processor 420 may display a second screen (e.g., a second idle screen (e.g., the second page of the home screen or another home screen)) corresponding to the designated second state (e.g., the second idle state) on the display 410 in response to the reception of the grip input (e.g., first touch inputs) corresponding to the designated second grip type from at least two of the plurality of side areas 410-1S, 410-2S, 410-3S, and 410-4S. According to an embodiment, the processor 420 may control at least one UI element displayed on the display 410 according to the identified grip type according to the identified operation state in response to the reception of the at least one second touch input, with the electronic device 401 gripped. According to an embodiment, the at least one UI element may include at least one of menus, icons, buttons, or objects (e.g., images, videos, or multimedia). According to an embodiment, the processor 420 may select, move, or resize the at least one UI element or perform the function designated to the at least one front UI element based on the reception of the touch input (e.g., at least one second touch input).

According to an embodiment, the electronic device 401 may perform at least one function of the application displayed according to the identified grip type in the identified operation state in response to the reception of the touch input. For example, the electronic device 401 may identify the application or at least one function of the application displayed on the front area 410F or each side area 410-1S, 410-2S, 410-3S, or 410-4S of the display 410 based on the identified operation state. For example, at least one function (e.g., zooming, volume-control, or execution screen control functions) may be preset for the application. The electronic device 401 may display the identified application or at least one function of the identified application in response to the reception of the touch input (e.g., at least one second touch input).

According to an embodiment, the electronic device 401 may control the zooming function of the application displayed on the display 410 according to the identified grip type in the identified operation state. For example, when the application is a camera application, the electronic device 401 may adjust the zoom-in or zoom-out of the preview image received from the camera module (e.g., the camera module 180 of FIG. 1 or the camera module 380 of FIGS. 3A to 3D) in response to the reception of the touch input (e.g., at least one second touch input).

According to an embodiment, the electronic device 401 may control the volume control function of the application displayed on the display 410 according to the identified grip type in the identified operation state. For example, when the application is an application for playing music, videos, or other multimedia data, the electronic device 401 may adjust the volume of the multimedia data being played on the application in response to the reception of the touch input (e.g., at least one second touch input).

According to an embodiment, the electronic device 401 may control the function related to the application execution screen displayed on the display 410 according to the identified grip type in the identified operation state. For example, when the application is an application for playing music, video, or other multimedia data, the electronic device 401 may control the size or direction of the execution screen of the application playing the multimedia data in response to the reception of the touch input (e.g., at least one second touch input). When a scroll occurs on the execution screen of the application (e.g., an album application or browser application), the electronic device 401 may control the scroll of the execution screen displayed on the display 410 in response to the reception of the touch input (e.g., at least one second touch input) and perform control to display the execution screen which scrolls under the scroll control.

According to an embodiment, the electronic device 401 may control different functions depending on types, positions, or counts of the touch input (e.g., at least one second touch input). For example, in a case where the application (e.g., video application) being executed is displayed on the display 410 based on the identified grip type in the identified operation state, if a first type (e.g., swipe) of second touch input is received, the electronic device 401 may adjust the first function (e.g., volume control) of the application according to the position, moving distance, or count of the first type of second touch input and, when a second type (e.g., tap or double-tap) of second touch input is received, the processor 420 may adjust the second function (e.g., the function of adjusting the size, direction, or color of the execution screen) of the application according to the position, moving distance, or count of the second type of second touch input. For example, in a case where the application (e.g., video application) being executed is displayed on the display 410 based on the identified grip type in the identified operation state, if the touch input (e.g., at least one second touch input) is received from one side area (e.g., 410-1S), the electronic device 401 may adjust the first function (e.g., volume control function) of the application and, if the touch input (e.g., at least one second touch input) is received from another side area (e.g., 410-1S, 410-2S, or 410-4S), the processor 420 may adjust the second function (e.g., the function of adjusting the size, direction, or color of the execution screen) of the application.

The embodiments of FIGS. 5 and 6 are described below in greater detail with reference to FIGS. 7A, 7B, 7C, 7D, 8A, 8B, 9A, 9B, 10, 11, 12, 13, 14A, 14B, 14C, and 15.

FIGS. 7A to 7D are views 700a, 700b, 700c, and 700d illustrating a display screen for describing interacting between a plurality of areas of a display included in an electronic device, according to an embodiment. The electronic device 701 of FIGS. 7A to 7D may include the whole or part of the electronic device 401 shown in FIG. 4. In FIGS. 7A to 7D, portions of the side areas 710-1S, 710-2S, 710-3S, and 710-4S corresponding to the edges of the display 410 included in the electronic device 701 may be removed, and the removed portions may be formed to be surrounded by the housing 790 (e.g., the housing 390 of FIG. 3). A front camera module 780 (e.g., the front camera module 380 of FIGS. 3A to 3C) may be included in the front area 710F (e.g., 410F of FIG. 4) of the display.

Figure 7A:
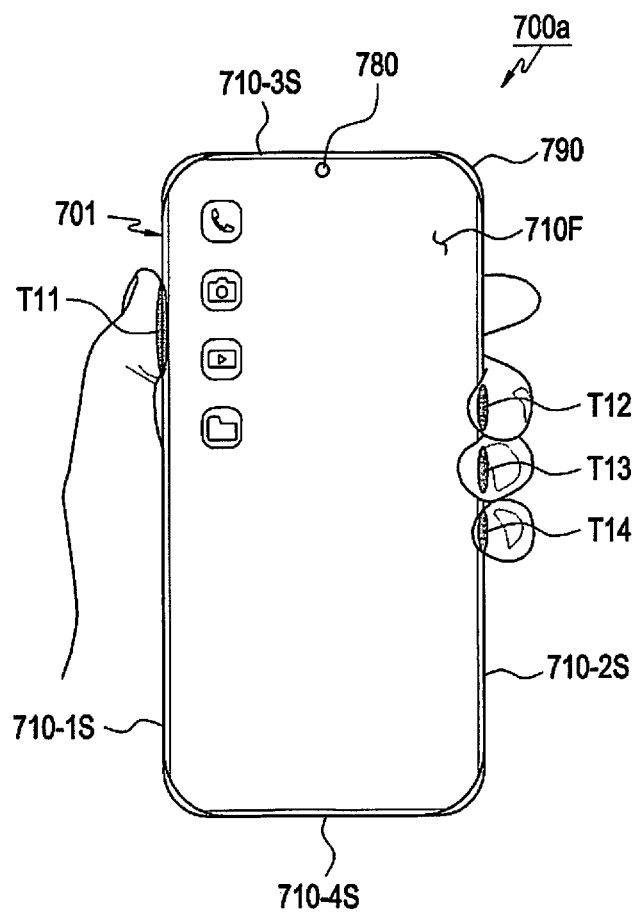
FIG. 7A is a view illustrating a display screen for describing interacting between a plurality of areas of a display included in an electronic device, according to an embodiment.

Referring to FIG. 7A, an embodiment of the display screen in a case where the grip type of the electronic device 701 is the first direction left-hand grip is illustrated in 700a.

In FIG. 7A, the electronic device 701 may receive a grip input for the display. The electronic device 701 may receive a first touch input T11 corresponding to the grip input from a first side (or left) area 710-1S of the display and first touch inputs T12, T13, and T14 corresponding to the grip input from a second side (or right) area 710-2S.

The electronic device 701 may identify the grip type for the electronic device 701 based on at least one of the numbers, coordinates, shapes, patterns, or sizes of the first touch inputs T11, T12, T13, and T14 corresponding to the grip input. For example, the electronic device 701 may identify the grip type of the electronic device 701 based on the number of the first touch inputs (e.g., T11) received from the first side area 710-1S and the number of the first touch inputs (e.g., T12, T13, and T14) received from the second side area 710-2S. For example, since the number of the first touch inputs received from the second side (or right) area 710-2S is larger than the number of the first touch inputs received from the first side (or left) area 710-2S, the electronic device 701 may identify that the grip type for the electronic device 701 is the first direction left-hand grip. When the same number of the first touch inputs (e.g., T11 and T12) are received from the first and second side areas 710-1S and 710-2S, the electronic device 701 may identify the grip type of the electronic device 701 based on at least one of the coordinates, shapes, patterns, or sizes of the first touch input T11 and the first touch input T12. For example, since the size of the first touch input T11 is larger than the size of the second touch input T12, the electronic device 701 may identify that the grip type for the electronic device 701 is the first direction left-hand grip.

The electronic device 701 may change and display at least one of a preset display position, display direction, display shape, or display size of at least one UI element (e.g., menu icons) according to the identified grip type. For example, upon identifying that the grip type for the electronic device 701 is the first direction left-hand grip as shown in FIG. 7A, the electronic device 701 may change and display at least one of a preset display position, display direction, display shape, or display size of the at least one UI element (e.g., menu icons) so that the at least one UI element (e.g., menu icons) is disposed around the position of the first touch input T11 (corresponding to the position of a finger, e.g., the left thumb) near a first edge (e.g., the left edge) of the front area 710F.

Figure 7B:
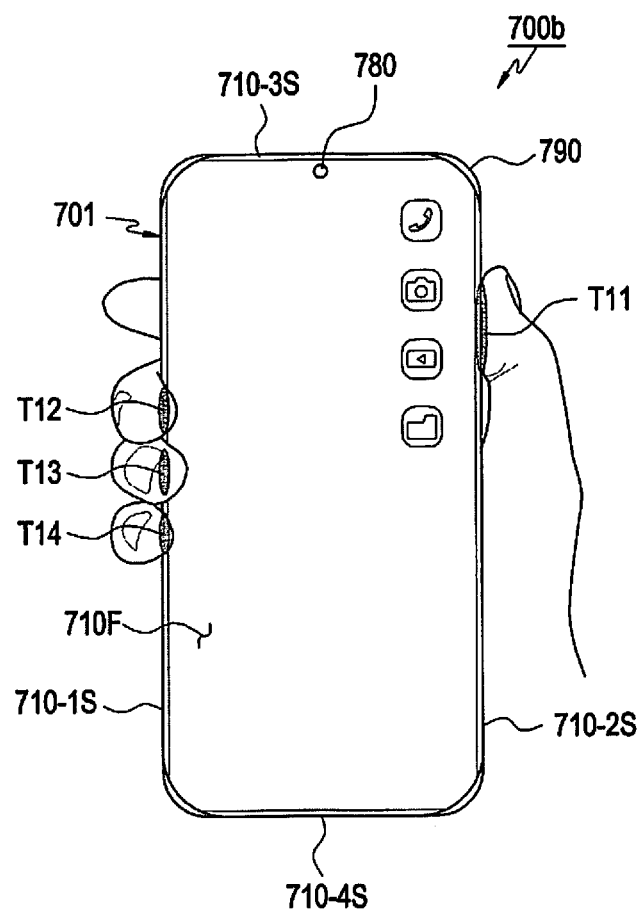
FIG. 7B is a view illustrating a display screen for describing interacting between a plurality of areas of a display included in an electronic device, according to an embodiment.

Referring to FIG. 7B, an embodiment of the display screen in a case where the grip type of the electronic device 701 is the first direction right-hand grip is illustrated in 700b.

Referring to FIG. 7B, the electronic device 701 may receive a first touch input T11 corresponding to the grip input from a second side (or right) area 710-2S and first touch inputs T12, T13, and T14 corresponding to the grip input from a first side (or left) area 710-1S. The embodiment of FIG. 7B relates to the same method of identifying the grip type for the electronic device 701 as the method according to the embodiment of FIG. 7A except that the touch inputs T11, T12, T13, and T14 received from the first and second side areas 710-1S and 710-2S are on opposite sides to the first touch inputs and the description of the embodiment of FIG. 7A applies to the embodiment of FIG. 7B. For example, upon identifying that the grip type for the electronic device 701 is the first direction right-hand grip as shown in FIG. 7B, the electronic device 701 may change and display at least one of a preset display position, display direction, display shape, or display size of the at least one UI element (e.g., menu icons) so that the at least one UI element (e.g., menu icon) is disposed around the position of the first touch input T11 (corresponding to the position of a finger, e.g., the right thumb) near a second edge (e.g., the right edge) of the front area 710F of the display 710.

Figure 7C:
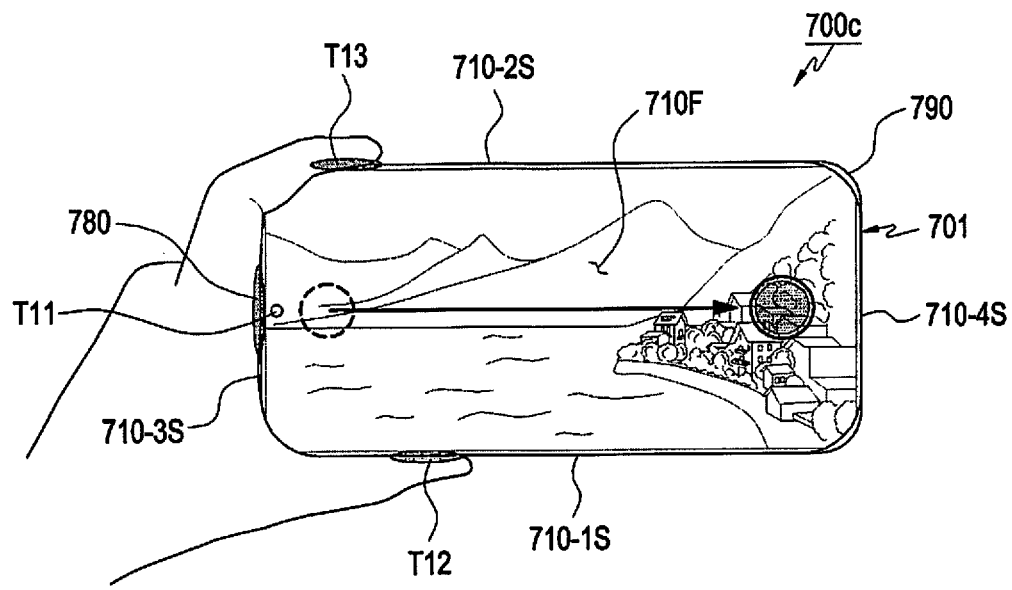
FIG. 7C is a view illustrating a display screen for describing interacting between a plurality of areas of a display included in an electronic device, according to an embodiment.

Referring to FIG. 7C, an embodiment of the display screen in a case where the grip type of the electronic device 701 is the second direction left-hand grip is illustrated in 700c.

Referring to FIG. 7C, the electronic device 701 may receive a first touch input T11 corresponding to the grip input from a third side area 710-3S, a first touch input T12 corresponding to the grip input from a first side area 710-1S, and a first touch input T13 corresponding to the grip input from a second side area 710-2S.

The electronic device 701 may identify the grip type for the electronic device 701 based on at least one of the numbers, coordinates, shapes, patterns, or sizes of the touch inputs T11, T12, and T13. For example, when a designated size or more of first touch input T11 is received from the third side area 710-3S and a first touch input T12 or T13 is received together from the first or second side area 710-1S or 710-2S, or the coordinates of the first touch input T12 or T13 received from the first or second side area 710-1S or 710-2S neighboring the third side area 710-3S are positioned within a designated area from the third side area 710-3S, the electronic device 701 may identify that the grip type for the electronic device 701 is the second direction left-hand grip (i.e., left hand grip of the left hand).

The electronic device 701 may change and display at least one of a preset display position, display direction, display shape, or display size of at least one UI element (e.g., a home button or capturing button) according to the identified grip type. For example, upon identifying that the grip type for the electronic device 701 is the second direction left-hand grip as shown in FIG. 7C, the electronic device 701 may change and display at least one of a preset display position, display direction, display shape, or display size of the at least one UI element (e.g., a home button or capturing button) so that the at least one UI element (e.g., a home button or capturing button) is disposed near a fourth edge (e.g., the bottom edge) of the front area 710F of the display 710.

Figure 7D:
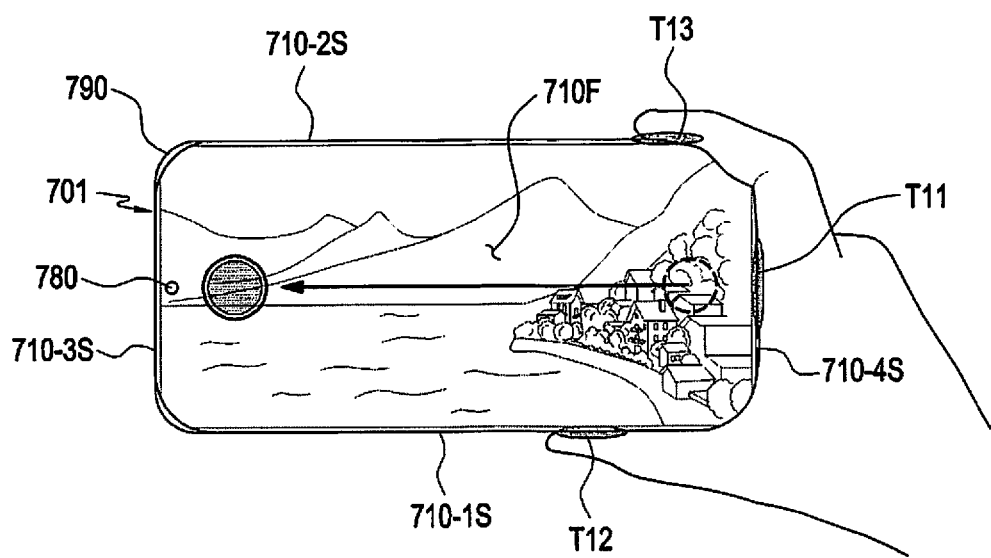
FIG. 7D is a view illustrating a display screen for describing interacting between a plurality of areas of a display included in an electronic device, according to an embodiment.

Referring to FIG. 7D, an embodiment of the display screen in a case where the grip type of the electronic device 701 is the second direction right-hand grip is illustrated in 700d.

Referring to FIG. 7D, the electronic device 701 may receive a first touch input T11 corresponding to the grip input from a fourth side area 710-4S (e.g., the fourth side area 410-4S), a first touch input T12 corresponding to the grip input from a first side area 710-1S, and a first touch input T13 corresponding to the grip input from a second side area 710-2S.

The electronic device 701 may identify the grip type for the electronic device 701 based on at least one of the numbers, coordinates, shapes, patterns, or sizes of the first touch inputs T11, T12, and T13. For example, when a designated size or more of first touch input T11 is received from the fourth side area 710-4S and a first touch input T12 or T13 is received together from the first or second side area 710-1S or 710-2S neighboring the fourth side area 710-4S, or the coordinates of the first touch input T12 or T13 received from the first or second side area 710-1S or 710-2S are positioned within a designated area from the fourth side area 710-4S, the electronic device 701 may identify that the grip type for the electronic device 701 is the second hand right-hand grip.

The electronic device 701 may change and display at least one of a preset display position, display direction, display shape, or display size of at least one UI element (e.g., a home button or capturing button) according to the identified grip type. For example, upon identifying that the grip type for the electronic device 701 is the second direction right-hand grip as shown in FIG. 7D, the electronic device 701 may change and display at least one of a preset display position, display direction, display shape, or display size of the at least one UI element (e.g., a home button or capturing button) so that the at least one UI element (e.g., a home button or capturing button) is disposed near a third edge (e.g., the top edge) of the front area 710F of the display 710.

Figure 8A:
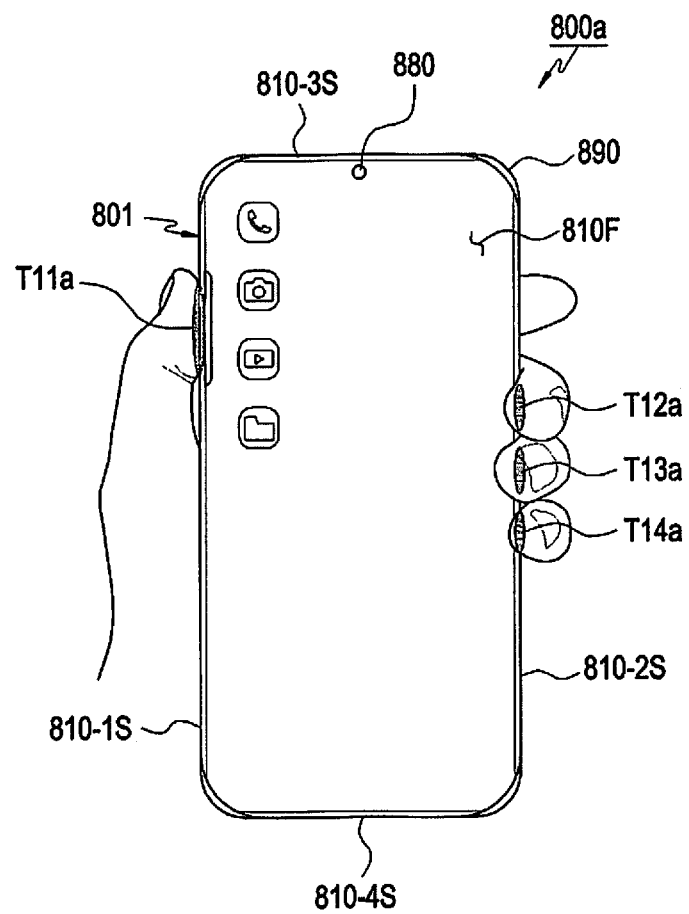
FIG. 8A is a view illustrating a user interface for describing a method of interacting between a plurality of areas of a display included in an electronic device, according to an embodiment.
Figure 8B:
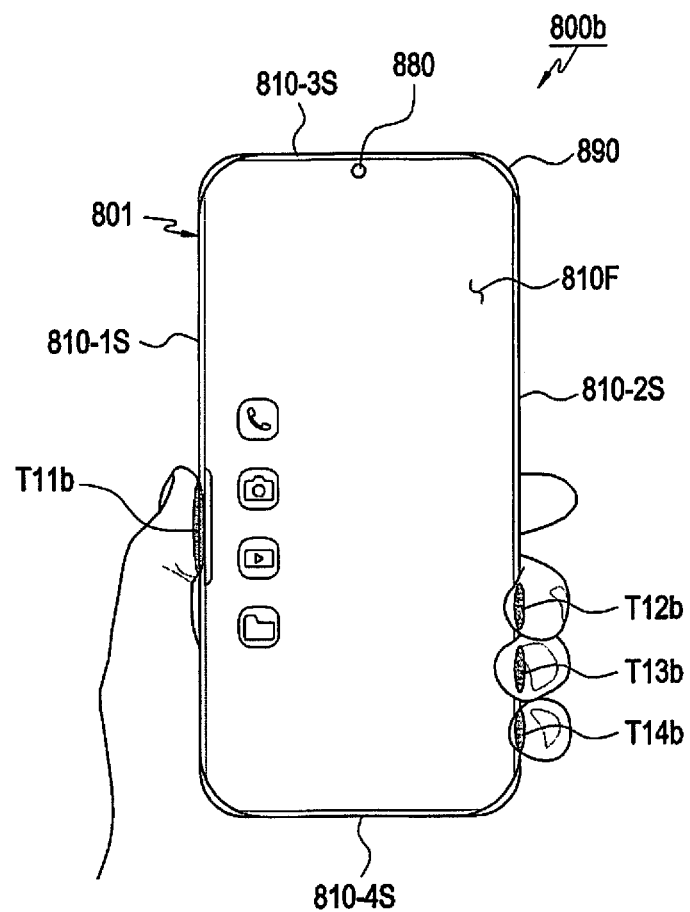
FIG. 8B is a view illustrating a user interface for describing a method of interacting between a plurality of areas of a display included in an electronic device, according to an embodiment.

FIGS. 8A and 8B are views 800a and 800b illustrating a display screen for describing interacting between a plurality of areas of a display included in an electronic device, according to an embodiment. The electronic device 801 of FIGS. 8A and 8B may include the whole or part of the electronic device 401 shown in FIG. 4. In FIGS. 8A and 8B, portions of the side areas 810-1S, 810-2S, 810-3S, and 810-4S corresponding to the edges of the display (e.g., the display 410) included in the electronic device 801 may be removed, and the removed portions may be formed to be surrounded by the housing 890 (e.g., the housing 390 of FIG. 3). A front camera module 880 (e.g., the front camera module 380 of FIGS. 3A to 3C) may be included in the front area 810F (e.g., 410F of FIG. 4) of the display.

Referring to FIGS. 8A and 8B, embodiments of the display screen in a case where the grip type identified based on the grip input for the display of the electronic device 801 is the first direction left-hand grip are illustrated in 800a and 800b. In the electronic device 801, the position in which at least one UI element (e.g., menu icons) is disposed may be varied according to the position of the first touch inputs T11b, T12b, T13b, and T14b in FIG. 8B, or the position of the first touch inputs T11a, T12a, T13a, and T14a in FIG. 8A, received from the first or second side area 710-1S or 710-2S of the display corresponding to the grip input. The electronic device 801 may change and display at least one of a preset display position, display direction, display shape, or display size of the at least one UI element (e.g., menu icons) to correspond to the position of the first touch input T11a or T11b corresponding to, e.g., the left thumb.

When the position of the first touch input T11a corresponding to the left thumb is over the first side area 810-1S as shown in FIG. 8A, the electronic device 801 may change and display at least one of a preset display position, display direction, display shape, or display size of the at least one UI element (e.g., menu icons) so that the at least one UI element (e.g., menu icon) is disposed around the position of the first touch input T11a at the upper end portion near the first edge (e.g., the left edge) of the front area 810F of the display.

When the position of the first touch input T11b corresponding to the left thumb is below the first side area 810-1S, which is comparatively below the position of the first touch input T11a of FIG. 8A, as shown in FIG. 8B, the electronic device 801 may change and display at least one of a preset display position, display direction, display shape, or display size of the at least one UI element (e.g., menu icons) so that the at least one UI element (e.g., menu icons) is disposed around the position of the first touch input T11b at the lower end portion near the first edge (e.g., the left edge) of the front area 810F.

Figure 9A:
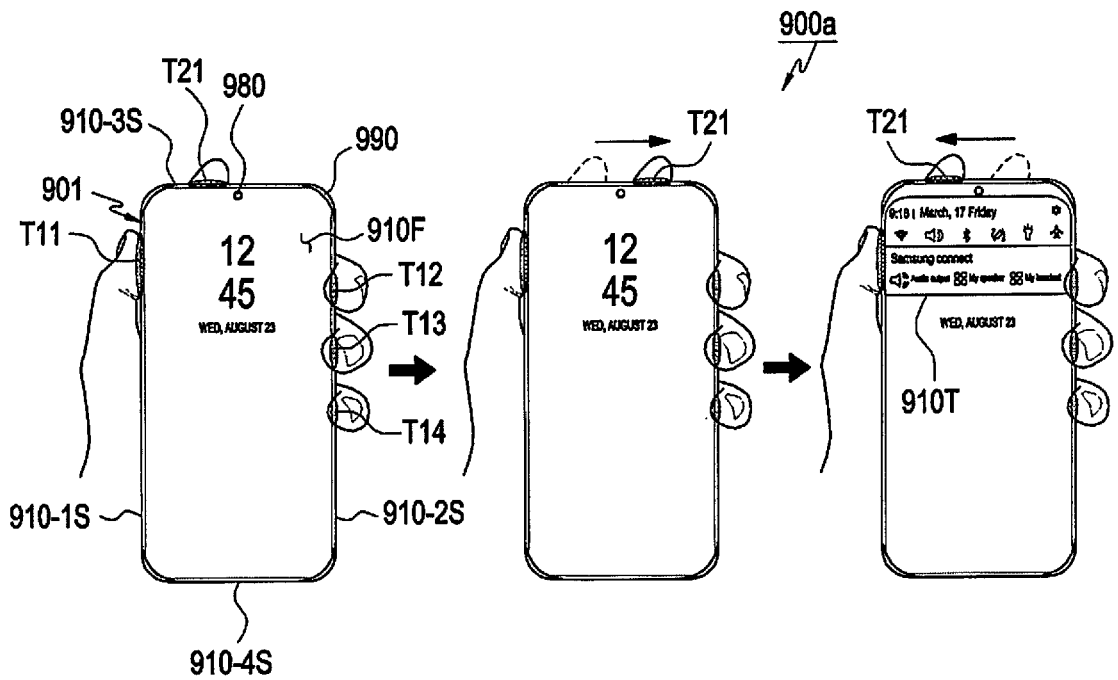
FIG. 9A is a view illustrating a display screen for describing interacting between a plurality of areas of a display included in an electronic device, according to an embodiment.
Figure 9B:
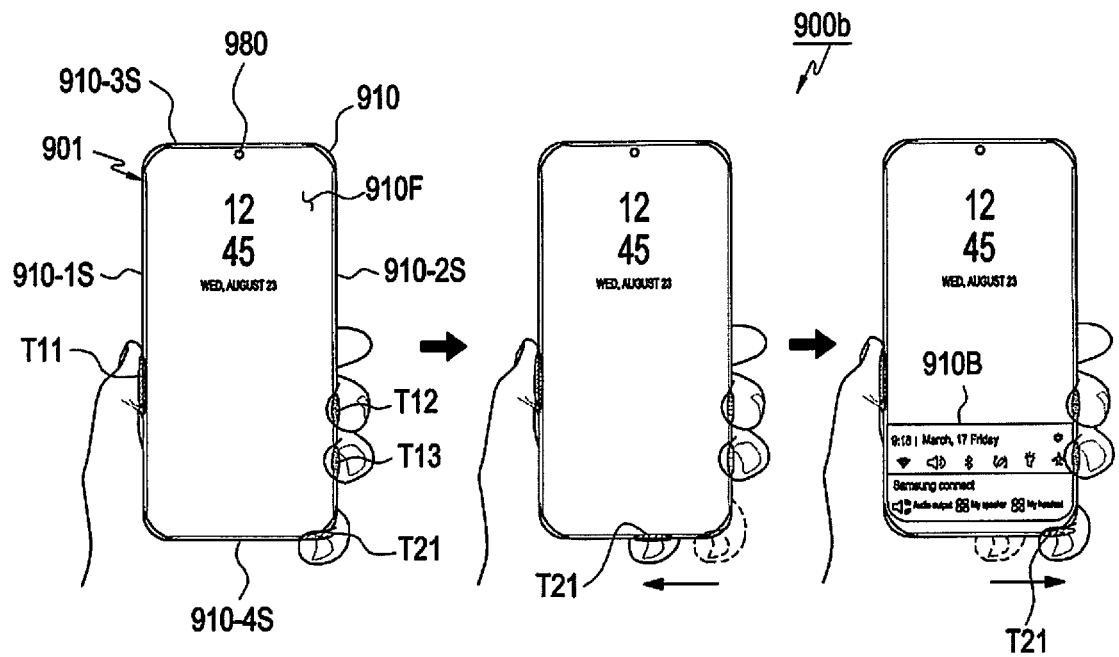
FIG. 9B is a view illustrating a display screen for describing interacting between a plurality of areas of a display included in an electronic device, according to an embodiment.

FIGS. 9A and 9B are views 900a and 900b illustrating a display screen for describing interacting between a plurality of areas of a display included in an electronic device, according to an embodiment. The electronic device 901 of FIGS. 9A and 9B may include the whole or part of the electronic device 401 shown in FIG. 4. In FIGS. 9A and 9B, portions of the side areas 910-1S, 910-2S, 910-3S, and 910-4S (e.g., 410-1S, 410-2S, 410-3S, and 410-4S of FIG. 4) corresponding to the edges of the display (e.g., the display 410) included in the electronic device 901 may be removed, and the removed portions may be formed to be surrounded by the housing 990 (e.g., the housing 390 of FIG. 3). A front camera module 980 (e.g., the front camera module 380 of FIGS. 3A to 3C) may be included in the front area 910F (e.g., 410F of FIG. 4) of the display.

Referring to FIGS. 9A and 9B, embodiments of the display screen in a case where the grip type identified based on the grip input for the display of the electronic device 901 is the first direction left-hand grip are illustrated in 900a and 900b.

Referring to FIGS. 9A and 9B, the electronic device 901 may identify that the grip type for the electronic device 901 is the first direction left-hand grip based on the first touch inputs T11, T12, T13, and T14 received from the first side (or left) area 910-1S and second side (or right) area 910-2S of the display, corresponding to the grip input. The electronic device 901 may identify the operation state (e.g., the idle state) of the electronic device 901 based on the identified grip type. The electronic device 901 may identify at least one function (e.g., the function of activating some areas of the display) related to the identified operation state (e.g., the idle state) among a plurality of functions that may be performed on the electronic device 901. The electronic device 901 may receive a touch input (e.g., at least one second touch input T21) from at least one side area 901-1S, 901-2S, 901-3S, or 901-4S while the identified first direction left-hand grip type is maintained (e.g., while at least some of the first touch inputs T11, T12, T13, and T14 are maintained). The electronic device 901 may perform control to activate at least some areas of the front area 910F displayed on the display according to the identified first direction left-hand grip type in the identified operation state (e.g., the idle state) in response to the reception of the received touch input (e.g., at least one second touch input T21).

As shown in FIG. 9A, the electronic device 901 may receive the touch input (e.g., at least one second touch input T21) from the third side area 910-3S while the identified grip type is maintained (e.g., while at least some of the first touch inputs T11, T12, T13, and T14 are maintained). The at least one second touch input T21 may be the touch input of dragging or swiping to the right or left on the third side area 910-3S. The electronic device 901 may activate some areas of the front area 910F according to the second touch input T21. For example, the electronic device 901 may activate an upper area 910T (e.g., a status bar) of a designated size from the third edge (e.g., the top edge) of the front area 910F in response to the reception of the second touch input T21. The upper area 910T may be displayed in a popped-up form.

As shown in FIG. 9B, the electronic device 901 may receive the touch input (e.g., at least one second touch input T21) from the fourth side area 910-4S while the identified grip type is maintained (e.g., while at least some of the first touch inputs T11, T12, and T13 are maintained). The at least one second touch input T21 may be the touch input of dragging or swiping to the left or right on the fourth side area 910-4S. The electronic device 901 may activate some areas of the front area 910F according to the second touch input T21. For example, the electronic device 901 may activate a lower area 910B (e.g., a status bar) of a designated size from the fourth edge (e.g., the bottom edge) of the front area 910F in response to the reception of the second touch input T21. The lower area 910B may be displayed in a popped-up form.

Figure 10:
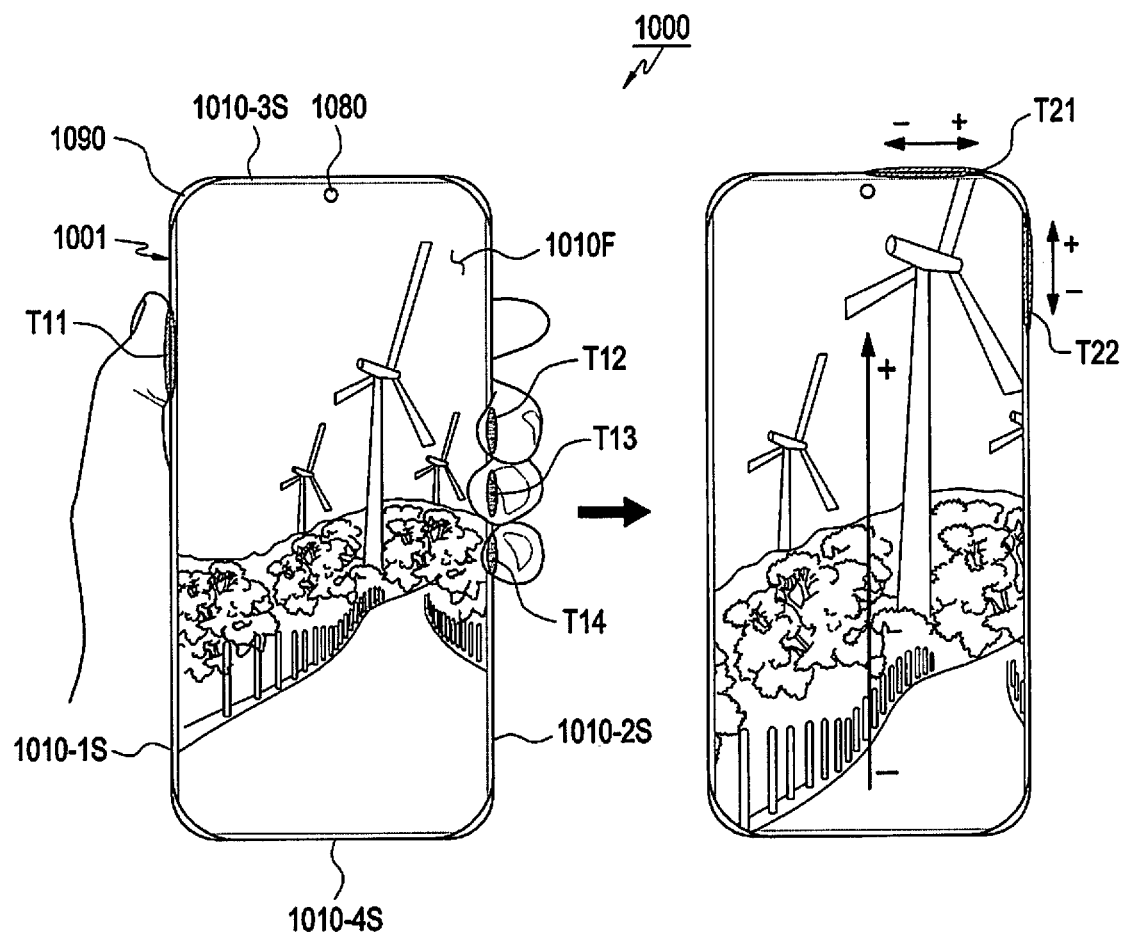
FIG. 10 is a view illustrating a display screen for describing interacting between a plurality of areas of a display included in an electronic device, according to an embodiment.

FIG. 10 is a view 1000 illustrating a display screen for describing interacting between a plurality of areas of a display included in an electronic device according to an embodiment. The electronic device 1001 of FIG. 10 may include the whole or part of the electronic device 401 shown in FIG. 4. In FIG. 10, portions of the side areas 1010-1S, 1010-2S, 1010-3S, and 1010-4S (e.g., 410-1S, 410-2S, 410-3S, and 410-4S of FIG. 4) corresponding to the edges of the display (e.g., the display 410) included in the electronic device 1001 may be removed, and the removed portions may be formed to be surrounded by the housing 1090 (e.g., the housing 390 of FIG. 3). A front camera module 1080 (e.g., the front camera module 380 of FIGS. 3A to 3C) may be included in the front area 1010F (e.g., 410F of FIG. 4) of the display.

The left-hand view of FIG. 10 illustrates an example execution screen of an application (e.g., a camera application) displayed according to the identified operation state of the electronic device 1001 corresponding to the grip input when the grip type identified based on the grip input for the display of the electronic device 1001 is the first direction left-hand grip. The electronic device 1001 may identify that the grip type for the electronic device 1001 is the first direction left-hand grip based on the first touch inputs T11, T12, T13, and 114 received from the first side (or left side) area 1010-1S and second side (or right side) area 1010-2S of the display, corresponding to the grip input. The electronic device 1001 may identify the operation state (e.g., the application execution state) of the electronic device 1001 based on the identified grip type. The electronic device 1001 may identify at least one function (e.g., the zoom function of the camera application) related to the identified operation state (e.g., the execution screen of the camera application) among a plurality of functions that may be performed on the electronic device 1001.

Referring to the right-hand view of FIG. 10, the electronic device 1001 may receive a touch input (e.g., at least one second touch input T21 or T22) from at least one side area 1010-1S, 1010-2S, 1010-3S, or 1010-4S while the identified grip type is maintained (e.g., while at least some of the first touch inputs T11, T12, T13, and T14 are maintained). The electronic device 1001 may control at least one function of the application displayed on the display in response to the reception of the touch input (e.g., at least one second touch input T21 or T22). When the identified grip type is the first direction left-hand grip, the electronic device 1001 may receive the at least one second touch input T21 or T22 from at least some area of the third side (or top side) area 1010-3S or at least some area of the second side (or right side) area 1010-2S.

The electronic device 1001 may control the zoom function of the application (e.g., a camera application) displayed on the display (e.g., the front area 1010F) according to a second touch input T21 (e.g., a swipe from − to + or from + to −) received from at least some area of the third side (or top side) area 1010-3S or according to a second touch input T22 (e.g., a swipe from + to −o from − to +) received from at least some area of the second side (or right side) area 1010-2S. The electronic device 1001 may control the zoom function of the application (e.g., a camera application) displayed on the front area 1010F according to simultaneous input of the second touch input T21 and the second touch input T22.

Figure 11:
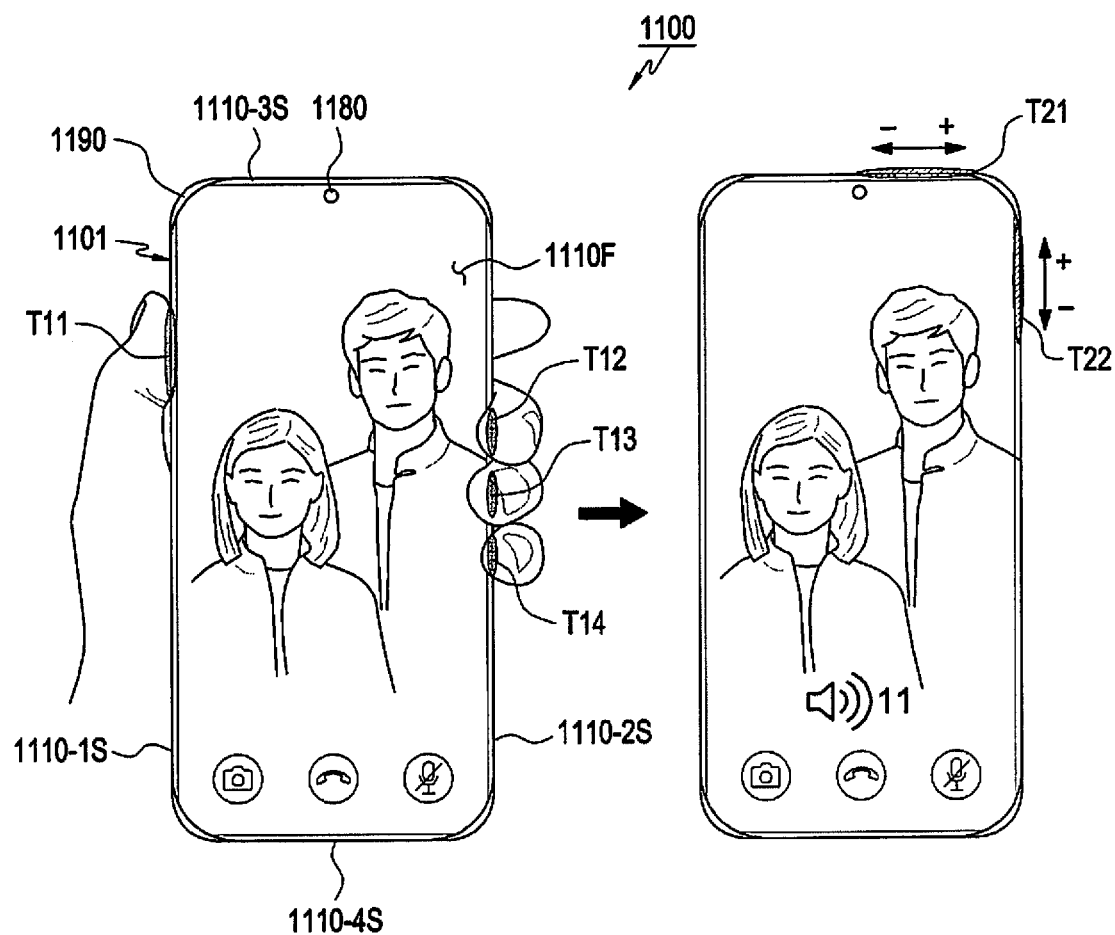
FIG. 11 is a view illustrating a display screen for describing interacting between a plurality of areas of a display included in an electronic device, according to an embodiment.

FIG. 11 is a view 1100 illustrating a display screen for describing interacting between a plurality of areas of a display included in an electronic device, according to an embodiment. The electronic device 1101 of FIG. 11 may include the whole or part of the electronic device 401 shown in FIG. 4. In FIG. 11, portions of the side areas 1110-1S, 1110-2S, 1110-3S, and 1110-4S (e.g., 410-1S, 410-2S, 410-3S, and 410-4S of FIG. 4) corresponding to the edges of the display (e.g., the display 410) included in the electronic device 1101 may be removed, and the removed portions may be formed to be surrounded by the housing 1190 (e.g., the housing 390 of FIG. 3). A front camera module 1180 (e.g., the front camera module 380 of FIGS. 3A to 3C) may be included in the front area 1110F (e.g., 410F of FIG. 4) of the display.

The left-hand view of FIG. 11 illustrates an example execution screen of an application (e.g., a video call application) displayed according to the identified operation state (e.g., an application execution state) of the electronic device 1101 corresponding to the grip input when the grip type identified based on the grip input for the display of the electronic device 1101 is the first direction left-hand grip. The electronic device 1101 may identify that the grip type for the electronic device 1101 is the first direction left-hand grip based on the first touch inputs T11, T12, T13, and T14 received from the first side (or left side) area 1110-1S and second side (or right side) area 1110-2S of the display, corresponding to the grip input. The electronic device 1101 may identify the operation state (e.g., the application execution state) of the electronic device 1101 based on the identified grip type. The electronic device 1101 may identify at least one function (e.g., the volume control function of the camera application) related to the identified operation state (e.g., the execution state of the video call application) among a plurality of functions that may be performed on the electronic device 1101.

Referring to the view on the right of FIG. 11, the electronic device 1101 may receive a touch input (e.g., at least one second touch input T21 or T22) from at least one side area 1110-1S, 1110-2S, 1110-3S, or 1110-4S while the identified grip type is maintained (e.g., while at least some of the first touch inputs T11, T12, T13, and T14 are maintained). The electronic device 1101 may control at least one function of the application displayed on the display in response to the reception of the touch input (e.g., at least one second touch input T21 or T22). When the identified grip type is the first direction left-hand grip, the electronic device 1101 may receive the at least one second touch input T21 or T22 from at least some area of the third side (or top side) area 1110-3S or at least some area of the second side (or right side) area 1110-2S.

The electronic device 1101 may control the volume control function of the application (e.g., a video call application) displayed on the display (e.g., the front area 1110F) according to a second touch input T21 (e.g., a swipe from − to + or from + to −) received from at least some area of the third side (or top side) area 1110-3S or according to a second touch input T22 (e.g., a swipe from + to −o from − to +) received from at least some area of the second side (or right side) area 1110-2S. The electronic device 1101 may control the volume control function of the application (e.g., a video call application) displayed on the front area 1110F according to a simultaneous input of the second touch input T21 and the second touch input T22.

Figure 12:
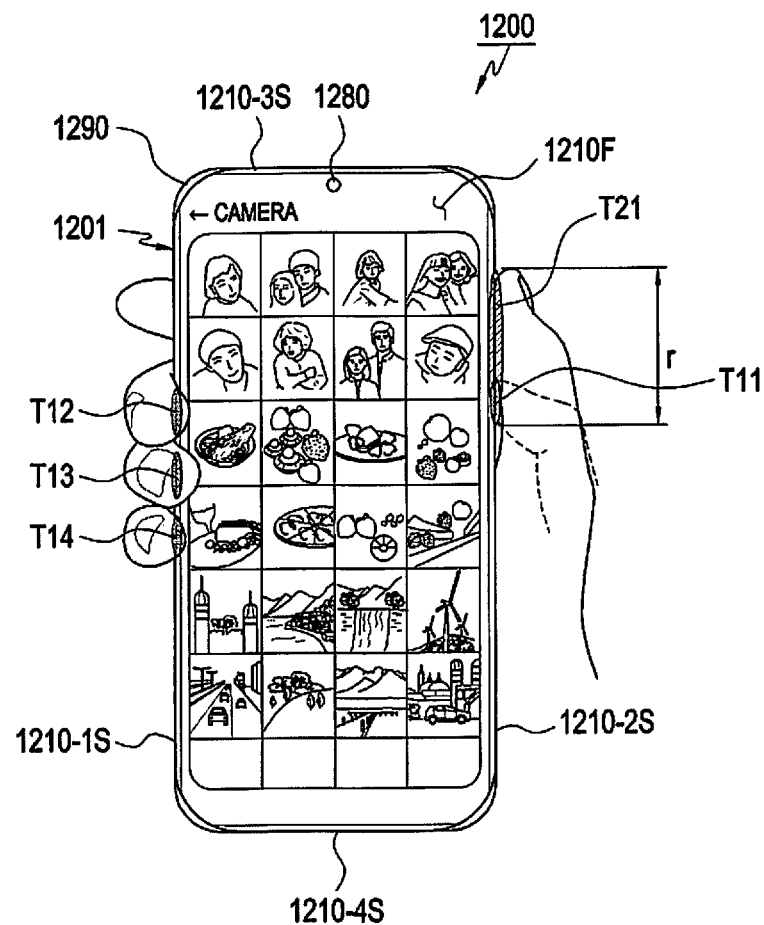
FIG. 12 is a view illustrating a display screen for describing interacting between a plurality of areas of a display included in an electronic device, according to an embodiment.

FIG. 12 is a view 1200 illustrating a display screen for describing interacting between a plurality of areas of a display included in an electronic device, according to an embodiment. The electronic device 1201 of FIG. 12 may include the whole or part of the electronic device 401 shown in FIG. 4. In FIG. 12, portions of the side areas 1210-1S, 1210-2S, 1210-3S, and 1210-4S (e.g., 410-1S, 410-2S, 410-3S, and 410-4S of FIG. 4) corresponding to the edges of the display (e.g., the display 410) included in the electronic device 1201 may be removed, and the removed portions may be formed to be surrounded by the housing 1290 (e.g., the housing 390 of FIG. 3). A front camera module 1280 (e.g., the front camera module 380 of FIGS. 3A to 3C) may be included in the front area 1210F (e.g., 410F of FIG. 4) of the display.

FIG. 12 illustrates an example execution screen of an application (e.g., a gallery application) displayed according to the identified operation state (e.g., an application execution state) of the electronic device 1201 corresponding to the grip input when the grip type identified based on the grip input for the display of the electronic device 1201 is the first direction right-hand grip. The electronic device 1201 may identify that the grip type for the electronic device 1201 is the first direction right-hand grip based on the first touch inputs T11, T12, T13, and T14 received from the first side (or left side) area 1210-1S and second side (or right side) area 1310-2S of the display, corresponding to the grip input. The electronic device 1201 may identify the operation state (e.g., the application execution state) of the electronic device 1201 based on the identified grip type. The electronic device 1201 may identify at least one function (e.g., a scroll function) related to the identified operation state (e.g., the execution state of the gallery application) among a plurality of functions that may be performed on the electronic device 1201.

Referring to FIG. 12, the electronic device 1201 may receive a touch input (e.g., at least one second touch input T21) from at least one side area 1210-1S, 1210-2S, 1210-3S, or 1210-4S while the identified grip type is maintained (e.g., while at least some (e.g., T12, T13, and T14) of the first touch inputs T11, T12, T13, and T14 are maintained). The electronic device 1201 may control at least one function of the application displayed on the display in response to the reception of the touch input (e.g., at least one second touch input T21). When the identified grip type is the first direction right-hand grip, the electronic device 1201 may receive the at least one second touch input T21 from at least some area of the second side (or right side) area 1210-2S.

The electronic device 1201 may control the scroll function occurring on the screen of the application (e.g., a gallery application) displayed on the display (e.g., the front area 1210F) according to the second touch input T21 (e.g., a drag, swipe, or flick) received from at least some area of the second side (or right side) area 1210-2S. The area within a designated distance r (e.g., the length of the right thumb when the right thumb is in the straight position) from the point where the first touch input T11 (e.g., a touch with the right thumb bent) is received from the second side (or right side) area 1210-2S may be set to at least some area of the second side (or right side) area 1210-2S, where the second touch input T21 is received. The electronic device 1201 may display the execution screen of the application which is scrolled under the scroll control by the application (e.g., a gallery application) displayed on the front area 1210F according to the second touch input T21.

Figure 13:
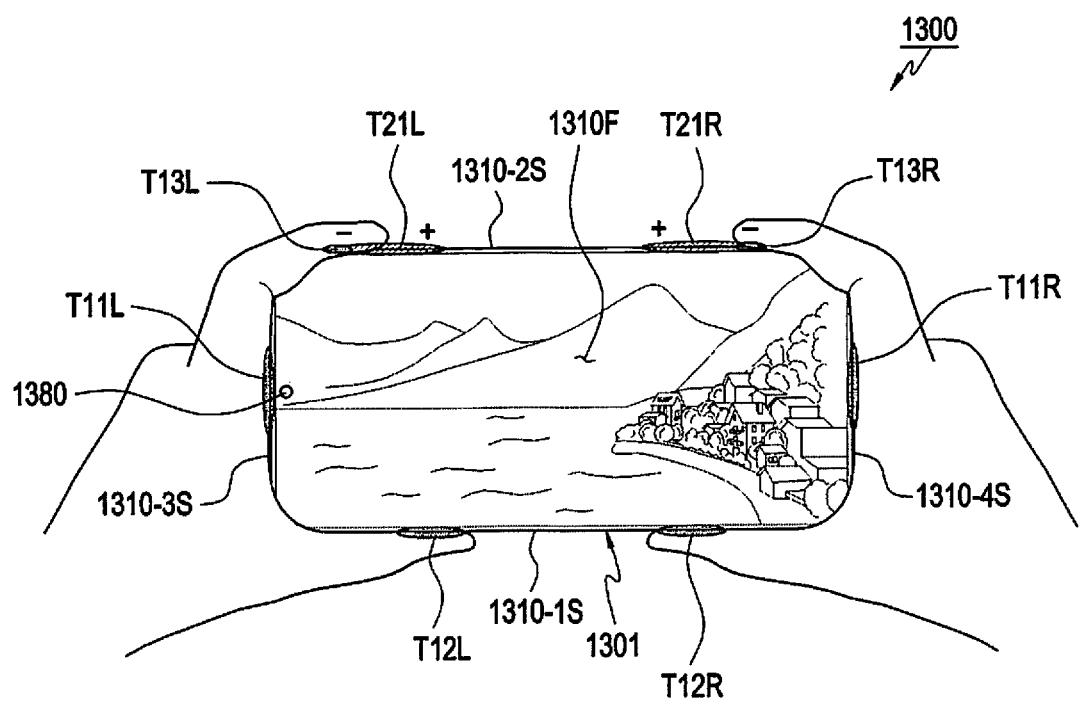
FIG. 13 is a view illustrating a display screen for describing interacting between a plurality of areas of a display included in an electronic device, according to an embodiment.

FIG. 13 is a view 1300 illustrating a display screen for describing interacting between a plurality of areas of a display included in an electronic device, according to an embodiment. The electronic device 1301 of FIG. 13 may include the whole or part of the electronic device 401 shown in FIG. 4. In FIG. 13, portions of the side areas 1310-1S, 1310-2S, 1310-3S, and 1310-4S (e.g., 410-1S, 410-2S, 410-3S, and 410-4S of FIG. 4) corresponding to the edges of the display (e.g., the display 410) included in the electronic device 1301 may be removed, and the removed portions may be formed to be surrounded by the housing 1390 (e.g., the housing 390 of FIG. 3). A front camera module 1380 (e.g., the front camera module 380 of FIGS. 3A to 3C) may be included in the front area 1310F (e.g., 410F of FIG. 4) of the display.

FIG. 13 illustrates an example execution screen of an application (e.g., a camera application) displayed according to the identified operation state (e.g., an application execution state) of the electronic device 1301 corresponding to the grip input when the grip type identified based on the grip input for the display of the electronic device 1301 is the second direction both-hand grip. The electronic device 1301 may identify that the grip type for the electronic device 1301 is the second direction both-hand grip based on the first touch input T13L or T13R from the side area 1310-2S, the first touch input T12L or T12R from the first side area 1310-1S, or the first touch inputs T11L and T11R from the third side area 1310-3S and the fourth side area 1310-4S of the display, corresponding to the grip input. The electronic device 1301 may identify the operation state (e.g., the application execution state) of the electronic device 1301 based on the identified grip type. The electronic device 1301 may identify at least one function (e.g., a volume control function, video play function, or execution screen control function) related to the identified operation state (e.g., the execution state of the video playing application) among a plurality of functions that may be performed on the electronic device 1301.

Referring to FIG. 13, the electronic device 1301 may receive a touch input (e.g., at least one second touch input T21L or T21R) from at least one side area 1310-1S, 1310-2S, 1310-3S, or 1310-4S while the identified grip type is maintained (e.g., while at least some (e.g., T11L, T13L, T11R, and T3R) of the first touch inputs T11L, T12L, T13L, and T11R, T12R, and T13R are maintained). The electronic device 1301 may control at least one function of the application displayed on the display in response to the reception of the touch input (e.g., at least one second touch input T21L or T21R). When the identified grip type is the second direction both-hand grip, the electronic device 1301 may receive the at least one second touch input T21L or T21R from at least some area of the second side (or right side) area 1310-2S. The at least some area of the second side (or right side) area 1310-2S, where the second touch input T21L or T21R is received may include the area within a designated distance (e.g., the length of the left index finger straightened out) from the point where the first touch input T12L (e.g., a touch with the left index finger bent) is received from the second (or right side) area 1310-2S or the area within a designated distance (e.g., the length of the right index finger straightened out) from the point where the first touch input T12R (e.g., a touch with the right index finger bent) is received from the second side (or right side) area 1310-2S

The electronic device 1301 may control at least one function of the application (e.g., a video playing application) displayed on the display (e.g., the front area 1310F) according to the second touch input T21L (e.g., a swipe from − to + or from + to −) received from at least some area of the second side area 1310-2S, the second touch input T21R (e.g., a swipe from + to − or from − to +), or simultaneous input of the second touch inputs T21L and T21R. The electronic device 1301 may control a different function of the application (e.g., a video playing application) displayed on the display (e.g., the front area 1310F) depending on a single input or simultaneous input of the second touch input T21L or T21R received from each of the at least some areas. For example, the electronic device 1301 may adjust the volume of the application (e.g., a video application) in response to the reception of the second touch input T21L, control such a video player function as playing or pausing the application (e.g., a video playing application) in response to the reception of the second touch input T21R, and control the execution screen control function including at least one operation (e.g., adjusting the screen size, direction, or color) related to the execution screen of the application (e.g., a video playing application) according to a simultaneous input of the second touch inputs T21L and T21R.

Figure 14A:
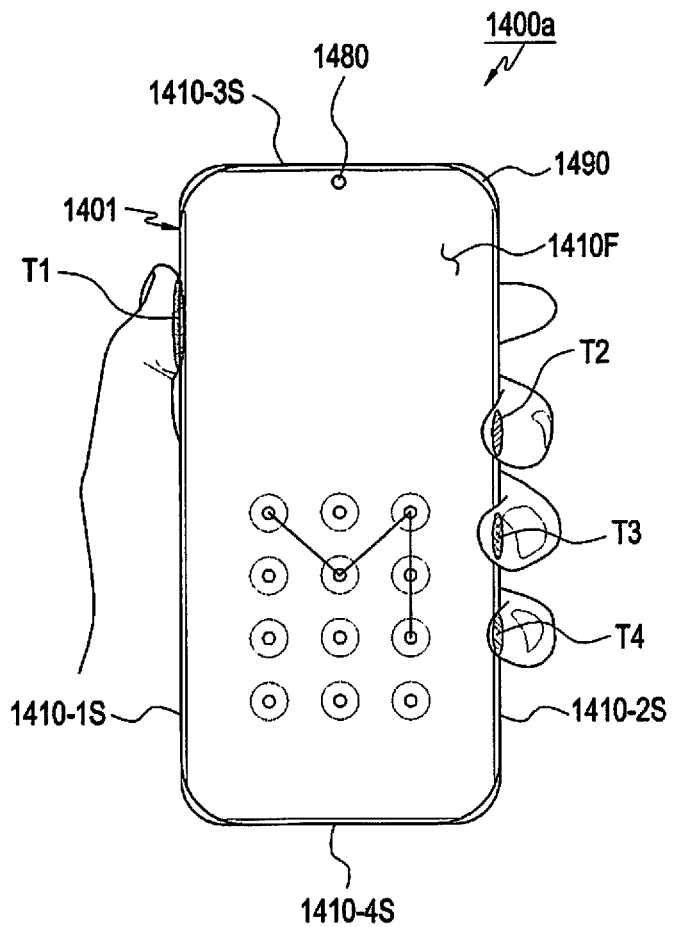
FIG. 14A is a view illustrating a display screen for describing interacting between a plurality of areas of a display included in an electronic device, according to an embodiment.
Figure 14B:
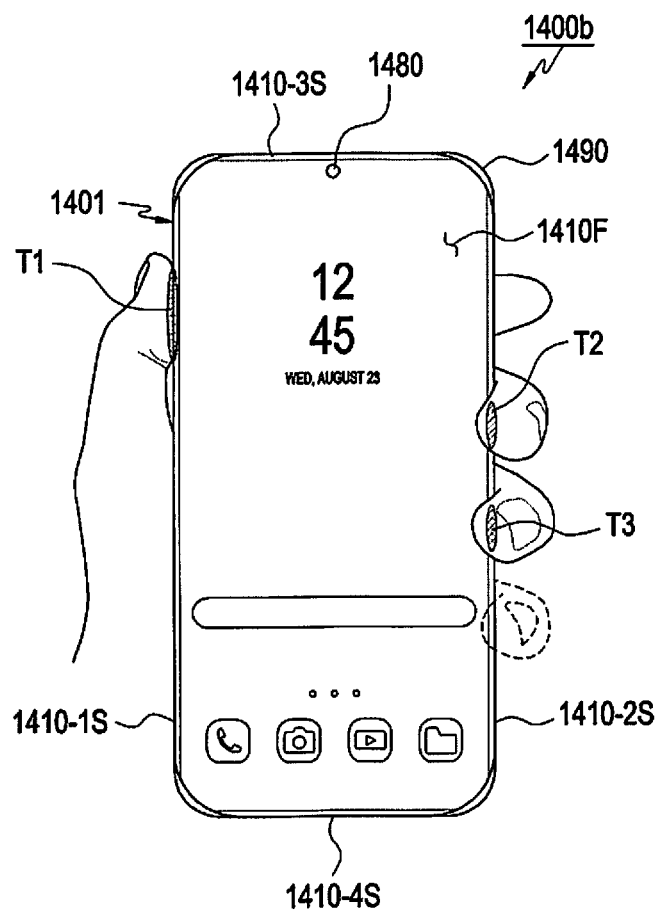
FIG. 14B is a view illustrating a display screen for describing interacting between a plurality of areas of a display included in an electronic device, according to an embodiment.
Figure 14C:
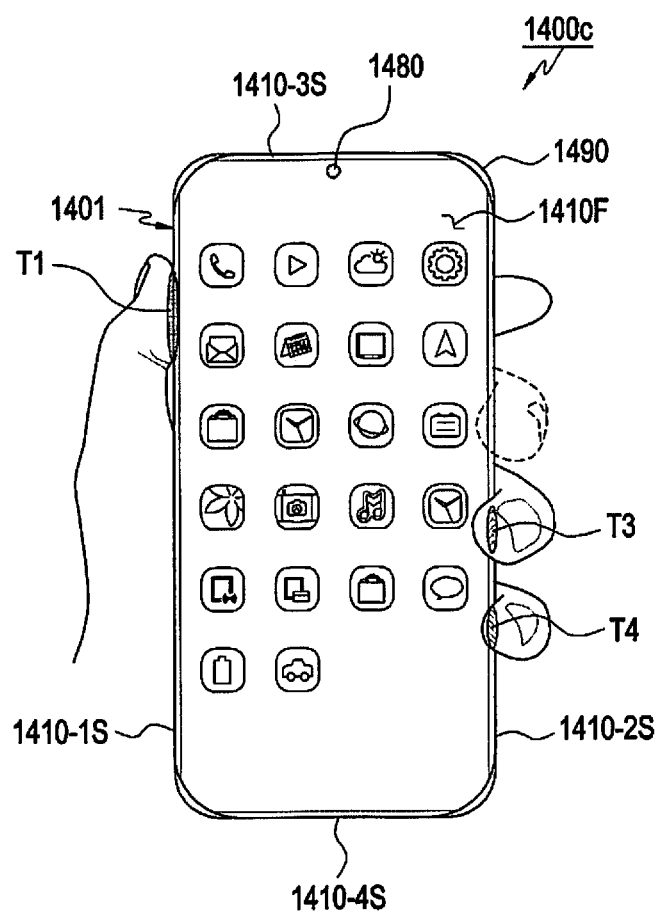
FIG. 14C is a view illustrating a display screen for describing interacting between a plurality of areas of a display included in an electronic device, according to an embodiment.

FIGS. 14A, 14B and 14C are views 1400a, 1400b, and 1400c illustrating a display screen for describing interacting between a plurality of areas of a display included in an electronic device, according to an embodiment. The electronic device 1401 of FIGS. 14A to 14C may include the whole or part of the electronic device 401 shown in FIG. 4. In FIGS. 14A and 14B, portions of the side areas 1410-1S, 1410-2S, 1410-3S, and 1410-4S (e.g., 410-1S, 410-2S, 410-3S, and 410-4S of FIG. 4) corresponding to the edges of the display (e.g., the display 410) included in the electronic device 1401 may be removed, and the removed portions may be formed to be surrounded by the housing 1490 (e.g., the housing 390 of FIG. 3). A front camera module 1480 (e.g., the front camera module 380 of FIGS. 3A to 3C) may be included in the front area 1410F (e.g., 410F of FIG. 4) of the display.

Various embodiments of the display screen in a case where the grip type identified based on the grip input for the display of the electronic device 1401 is the first direction left-hand grip are respectively illustrated in 1400a in FIG. 14A, 1400b in FIG. 14B, and 1400c in FIG. 14C.

Referring to FIG. 14A, the electronic device 1401 may receive first touch inputs (e.g., T1, T2, T3, and T4) corresponding to a designated grip type from at least two side areas (e.g., 1410-1S and 1410-2S) corresponding to the grip input among a plurality of side areas 1410-1S, 1410-2S, 1410-3S, and 1410-4S of the display. The electronic device 1401 may identify a designated operation state (e.g., the locked state) of the electronic device 1401 corresponding to the designated grip type based on the first touch inputs (e.g., T1, T2, T3, and T4) corresponding to the designated grip input. The electronic device 1401 may display a screen (e.g., the lock screen) to be displayed corresponding to the identified operation state (e.g., the locked state) on the display (e.g., the front area 1410F) based on the identified designated grip type.

When the designated operation state corresponding to the designated grip type is the locked state, the electronic device 1401 may provide various tactile feedbacks to the user through the haptic circuit (e.g., the haptic circuit 470) based on the designated grip type. For example, the electronic device 1401 may provide different tactile feedbacks depending on the first touch inputs (e.g., T1, T2, T3, and T4) corresponding to the designated grip type. The user may intuitively recognize whether the electronic device has been precisely gripped according to the designated grip type through the tactile feedback. The electronic device 1401 may release the locked state of the electronic device 1401 upon performing at least one unlocking operation (e.g., a pattern input operation) on the lock screen. At least some of the first touch inputs T1, T2, T3, and T4 may be changed so that the electronic device 1401 corresponds to the designated grip type to release the locked state of the electronic device 1401 and enter the idle state.

According to an embodiment, in a case where a first grip type designated to release the locked state of the electronic device 1401 and enter a first idle state is set to a first grip input corresponding to the first touch inputs T1, T2, and T3, if a first touch input T4 among first touch inputs T1, T2, T3, and T4 is removed as shown in FIG. 14B, the electronic device 1401 may release its locked state, enter the first idle state, and display a first idle screen (e.g., a representative screen or a first page of the home screen) corresponding to the first idle state on the display (e.g., the front area 1410F).

Figure 15:
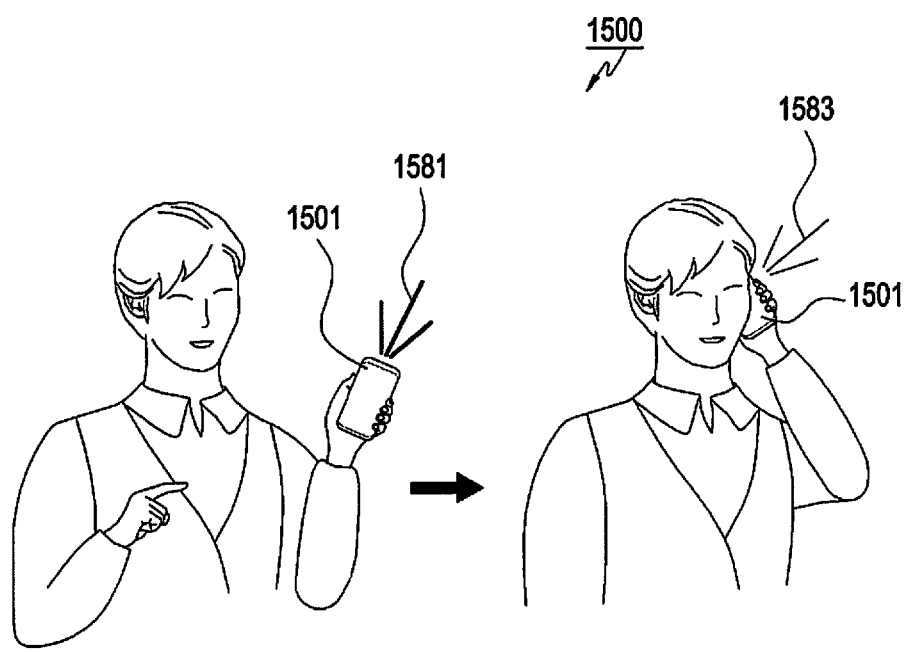
FIG. 15 is a view illustrating a display screen for describing interacting between a plurality of areas of a display included in an electronic device, according to an embodiment.

According to an embodiment, in a case where a second grip type designated to release the locked state of the electronic device 1401 and enter a second idle state is set to a second grip input corresponding to the first touch inputs T1, T3, and T4, if the first touch input T2 among the first touch inputs T1, T2, T3, and T4 is removed as shown in FIG. 14C, the electronic device 1401 may release its locked state, enter the second idle state, and display a second idle screen (e.g., a representative screen or a second page of the home screen) corresponding to the second idle state on the display (e.g., the front area 1410F). FIG. 15 is a view 1500 illustrating a display screen for describing interacting between a plurality of areas of a display included in an electronic device according to an embodiment. The electronic device 1501 of FIG. 15 may include the whole or part of the electronic device 401 shown in FIG. 4.

The view on the left side of FIG. 15 illustrates an embodiment 1500 in which the electronic device 1501 outputs output signals or data (e.g., sounds or voices) through a sound output device (e.g., the sound output device 480). The electronic device 1501 may output (1581) output signals or data (e.g., sounds or voices) through a first speaker (e.g., the first speaker 481) (e.g., a main speaker) of the sound output device 480. The first speaker 480 may be a speaker (or receiver), such as a dynamic driver or balanced armature driver, in which case output signals or data may be output 1581 through a speaker hole (e.g., the speaker hole 355h of FIG. 3) formed in the rear surface of the electronic device 1501.

Referring to the view on the right side of the embodiment 1500 illustrated in FIG. 15, when the electronic device 1501 is positioned at a designated angle (or posture) while an output signal or data (e.g., a sound or voice) are output 1581 through the first speaker 481, the electronic device 1501 may make a change so that the output signal or data being output 1581 through the first speaker 481 is output 1583 through a second speaker (e.g., the second speaker 483) (e.g., an assistant speaker). The second speaker 483 may be a speaker (or receiver), such as a piezo ceramic driver. Upon receiving at least one proximity signal (e.g., a proximity signal received from a designated area (e.g., an upper area or the area corresponding to the user's ear) of the front area (e.g., 410F of FIG. 4)) at an angle (or posture) other than the designated angle, the electronic device 1501 may make a change so that the output signal or data being output 1581 through the first speaker 481 is output 1583 through the second speaker (e.g., the second speaker 483).

According to an embodiment, the electronic device 1501 may adjust the output volume using the second speaker 483 and may thus be used as the main or assistant speaker. For example, when the second speaker 483, such as a piezo ceramic driver, is used as the main speaker, the electronic device 1501 may produce the output at a first magnitude and, when used as an assistant speaker, at a second magnitude which is smaller than the first magnitude.

As is apparent from the foregoing description, according to various embodiments, the front surface and the plurality of side surfaces of the electronic device may include curved areas bent from outer side surfaces of the front area. Each of the front surface and the plurality of side surfaces may be used for displaying content. In the display, the hardware components (e.g., buttons or terminals) which require a physical space for the front area may be replaced with digital or wireless ones, and this enables an omni-directional device design or a full-screen in-display design.

Thus, it is possible to identify various functions corresponding to various touch inputs received from the plurality of side areas of the display according to the grip type identified based on the grip input for the display. The electronic device may perform various functions identified according to the grip, thereby enabling design of highly desirable user experiences (UXs).

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
a display including a front area and a plurality of side areas comprising a first side area corresponding to a left side area, a second side area corresponding to a right side area, a third side area corresponding to an upper side area, and a fourth side area corresponding to a lower side area, wherein the first side area, the second side area, the third side area, and the fourth side area indicate different directions from each other;
at least one processor; and
at least one memory, wherein the at least one memory stores instructions configured to, when executed, enable the at least one processor to:
receive a grip input for the display through the first side area and the second side area,
identify a grip type based on the grip input and identify an operation state of the electronic device,
in response to a first touch input being received through the third side area of the plurality of side areas while the grip type identified through the first side area and the second side area is maintained, display a first screen identified based on the identified operation state, on a first area corresponding to the third side area among the front area of the display, and
in response to a second touch input being received through the fourth side area while the grip type identified through the first side area and the second side area is maintained, display a second screen identified based on the identified operation state, on a second area corresponding to the fourth side area among the front area of the display.

2. The electronic device of claim 1, wherein the instructions are further configured to, when executed, enable the at least one processor to:
identify the grip type based on at least one of numbers, coordinates, shapes, patterns, or sizes of the grip input.

3. The electronic device of claim 1, wherein the instructions are further configured to, when executed, enable the at least one processor to:
perform different functions based on a grip type, an operation state, or a direction of a touch input.

4. The electronic device of claim 1, wherein the instructions are further configured to, when executed, enable the at least one processor to:
deactivate the first side area and the second side area, and
receive the first touch input through the third side area or the second touch input through the fourth side area neighboring the deactivated first side area and the deactivated second side area.

5. The electronic device of claim 1, wherein the instructions are further configured to, when executed, enable the at least one processor to:
in response to the operation state being identified as an idle state, activate at least one of the third side area or the fourth side area, and
in response to the first touch input or the second touch input being received, activate the first area or the second area among the front area.

6. The electronic device of claim 1, wherein the operation state is identified based on the grip type.

7. The electronic device of claim 1, wherein the instructions are further configured to, when executed, enable the at least one processor to:
provide a tactile feedback through a haptic circuit of the electronic device based on the grip type.

8. A method of operating an electronic device comprising a display including a front area and a plurality of side areas comprising a first side area corresponding to a left side area, a second side area corresponding to a right side area, a third side area corresponding to an upper side area, and a fourth side area corresponding to a lower side area, the method comprising:
receiving a grip input for the display through the first side area and the second side area;
identifying a grip type based on the grip input and identifying an operation state of the electronic device;
in response to a first touch input being received through the third side area of the plurality of side areas while the grip type identified through the first side area and the second side area is maintained, displaying a first screen identified based on the identified operation state, on a first area corresponding to the third side area among the front area of the display; and
in response to a second touch input being received through the fourth side area while the grip type identified through the first side area and the second side area is maintained, displaying a second screen identified based on the identified operation state, on a second area corresponding to the fourth side area among the front area of the display.

9. The method of claim 8, further comprising:
identifying the grip type based on at least one of numbers, coordinates, shapes, patterns, or sizes of the grip input.

10. The method of claim 8, further comprising:
deactivating the first side area and the second side area, and
receiving the first touch input through the third side area or the second touch input through the fourth side area neighboring the deactivated first side area and the deactivated second side area.

11. The method of claim 8, further comprising:
in response to the operation state being identified as an idle state, activating at least one of the third side area or the fourth side area, and
in response to the first touch input or the second touch input being received, activating the first area or the second area among the front area.

12. The method of claim 8, wherein the operation state is identified based on the grip type.

13. A non-transitory computer readable recording medium recording a program running on a computer, the program comprising executable instructions configured to, when executed by a processor, enable the processor to:
receive a grip input for a display included in an electronic device through a first side area corresponding to a left side area and a second side area corresponding to a right side area of a plurality of side areas of the display,
identify a grip type based on the grip input and identify an operation state of the electronic device,
in response to a first touch input being received through a third side area corresponding to an upper side area of the plurality of side areas of the display while the grip type identified through the first side area and the second side area is maintained, display a first screen identified based on the identified operation state, on a first area corresponding the third side area among the front area of the display, and
in response to a second touch input being is received through the fourth side area while the grip type identified through the first side area and the second side area is maintained, display a first screen identified based on the identified operation state, on a first area corresponding to the third side area among the front area of the display.

14. The non-transitory computer-readable recording medium of claim 13, wherein the program further comprises executable instructions configured to, when executed by the processor, enable the processor to:
identify the grip type based on at least one of numbers, coordinates, shapes, patterns, or sizes of the grip input.

15. The non-transitory computer-readable recording medium of claim 13, wherein the program further comprises executable instructions configured to, when executed by the processor, enable the processor to:
deactivate the first side area and the second side area, and
receive the first touch input through the third side area or the second touch input through the fourth side area neighboring the deactivated first side area and the deactivated second side area.

16. The non-transitory computer-readable recording medium of claim 13, further comprising:
in response to the operation state being identified as an idle state, activating at least one of the third side area or the fourth side area, and
in response to the first touch input or the second touch input being received, activating the first area or the second area among the front area.

17. The non-transitory computer-readable recording medium of claim 13, wherein the operation state is identified based on the grip type.

* * * * *